(12) United States Patent
Teraguchi

(10) Patent No.: US 12,729,972 B2
(45) Date of Patent: Sep. 8, 2026

(54) ROUTE GUIDE DEVICE, ROUTE GUIDE METHOD, AND ROUTE GUIDE PROGRAM THAT REDUCE ENERGY CONSUMPTION ASSOCIATED WITH ROUTE GUIDANCE DISPLAY

(71) Applicant: Nissan Motor Co., Ltd., Yokohama (JP)

(72) Inventor: Takehito Teraguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 432 days.

(21) Appl. No.: 18/550,702

(22) PCT Filed: Apr. 19, 2021

(86) PCT No.: PCT/JP2021/015885

§ 371 (c)(1),
(2) Date: Sep. 15, 2023

(87) PCT Pub. No.: WO2022/224311

PCT Pub. Date: Oct. 27, 2022

(65) Prior Publication Data

US 2024/0183680 A1 Jun. 6, 2024

(51) Int. Cl.
*G01C 21/36* (2006.01)

(52) U.S. Cl.
CPC ................................ *G01C 21/3626* (2013.01)

(58) Field of Classification Search
CPC .................................................. G01C 21/3626
See application file for complete search history.

(56) References Cited

U.S. PATENT DOCUMENTS

| | | | | |
|---|---|---|---|---|
| 9,746,334 B1 * | 8/2017 | Mahajan | H04W 4/46 | |
| 10,606,075 B2 * | 3/2020 | Choi | G02B 27/0101 | |
| 2012/0166078 A1 * | 6/2012 | Choi | G01C 21/3661 | 701/436 |
| 2012/0327188 A1 * | 12/2012 | Takemura | G08G 1/167 | 348/148 |
| 2015/0291160 A1 * | 10/2015 | Kim | B60W 30/16 | 345/633 |
| 2018/0158334 A1 * | 6/2018 | Perez Barrera | G08G 1/166 | |
| 2019/0126816 A1 * | 5/2019 | Li | B60Q 1/46 | |
| 2020/0171951 A1 * | 6/2020 | Matsumoto | G01C 21/36 | |
| 2020/0174496 A1 * | 6/2020 | Hase | H04W 84/20 | |

FOREIGN PATENT DOCUMENTS

| | | |
|---|---|---|
| JP | 2011-27441 A | 2/2011 |
| JP | 2019-184356 A | 10/2019 |

* cited by examiner

*Primary Examiner* — Jess Whittington
(74) *Attorney, Agent, or Firm* — Spencer Fane LLP

(57) ABSTRACT

A route guidance device includes a travel plan acquisition unit, a travel plan comparison unit, and a route guidance display control unit. The travel route acquisition unit acquires travel plans of a host vehicle and of another vehicle. The travel plan comparison unit compares a host vehicle travel plan, and the travel plan of the other vehicle. The route guidance display control unit displays the host vehicle the route guidance information as an image at least when the host vehicle travel plan and the travel plan of the other vehicle do not match. Also, the route guidance display control unit suppresses the display of a part or all of the route guidance information when the travel plan of the host vehicle and the travel plan of the other vehicle do match.

10 Claims, 9 Drawing Sheets

[FIG. 1]
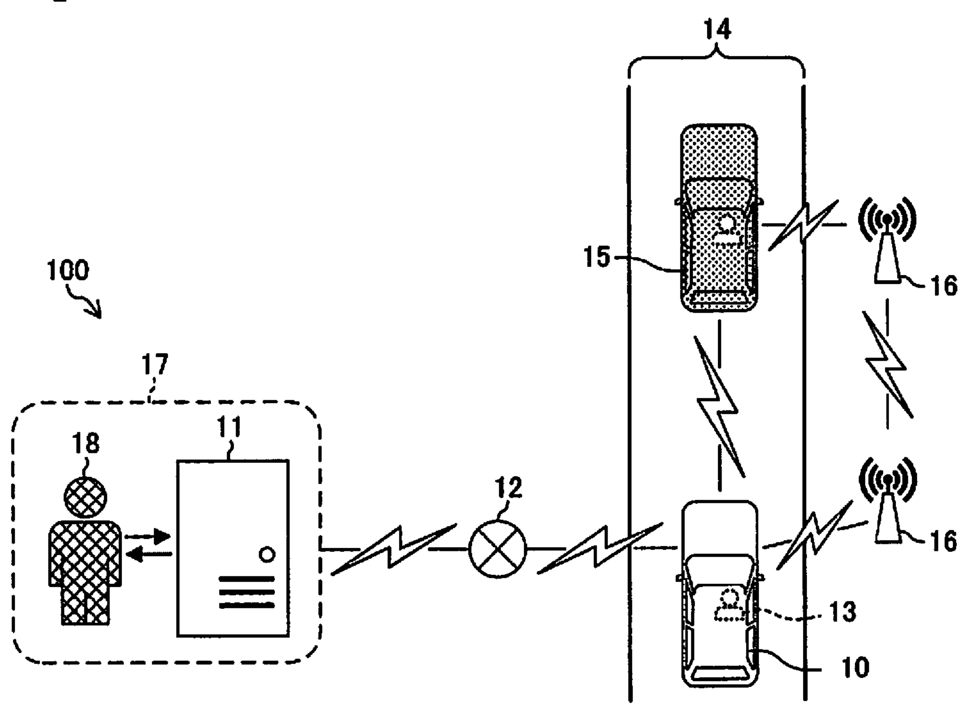
[FIG. 2]
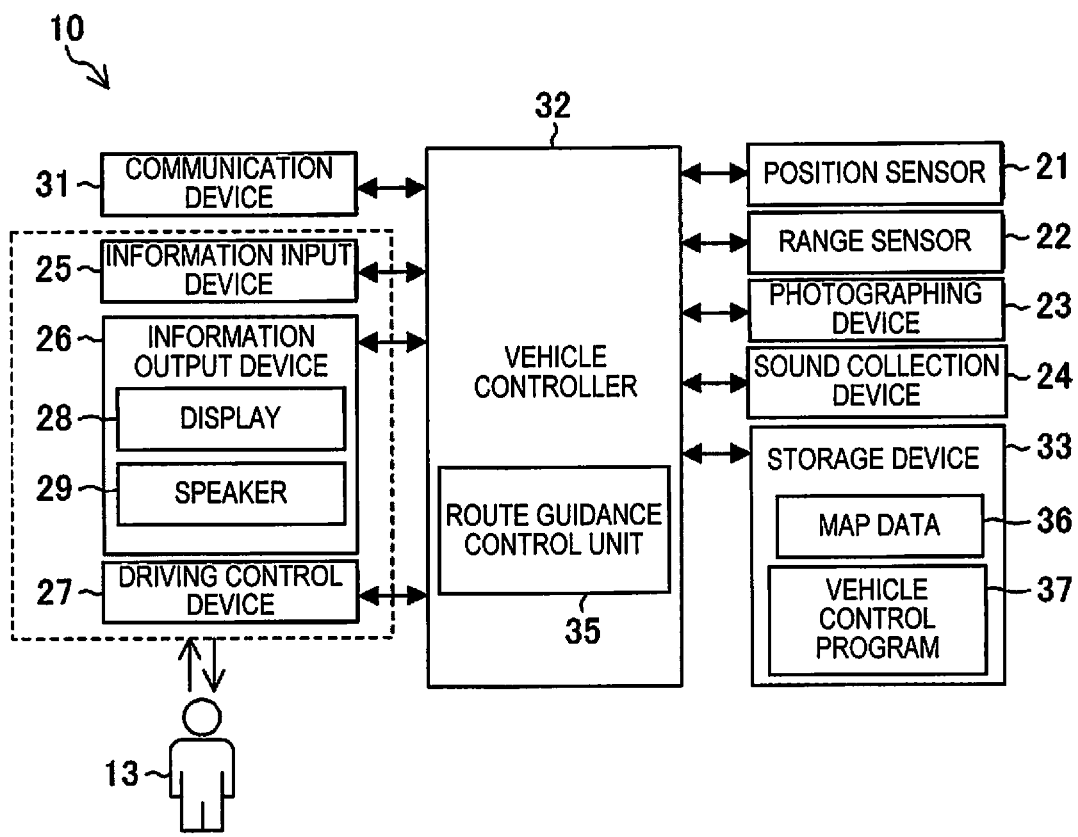

[FIG. 3]
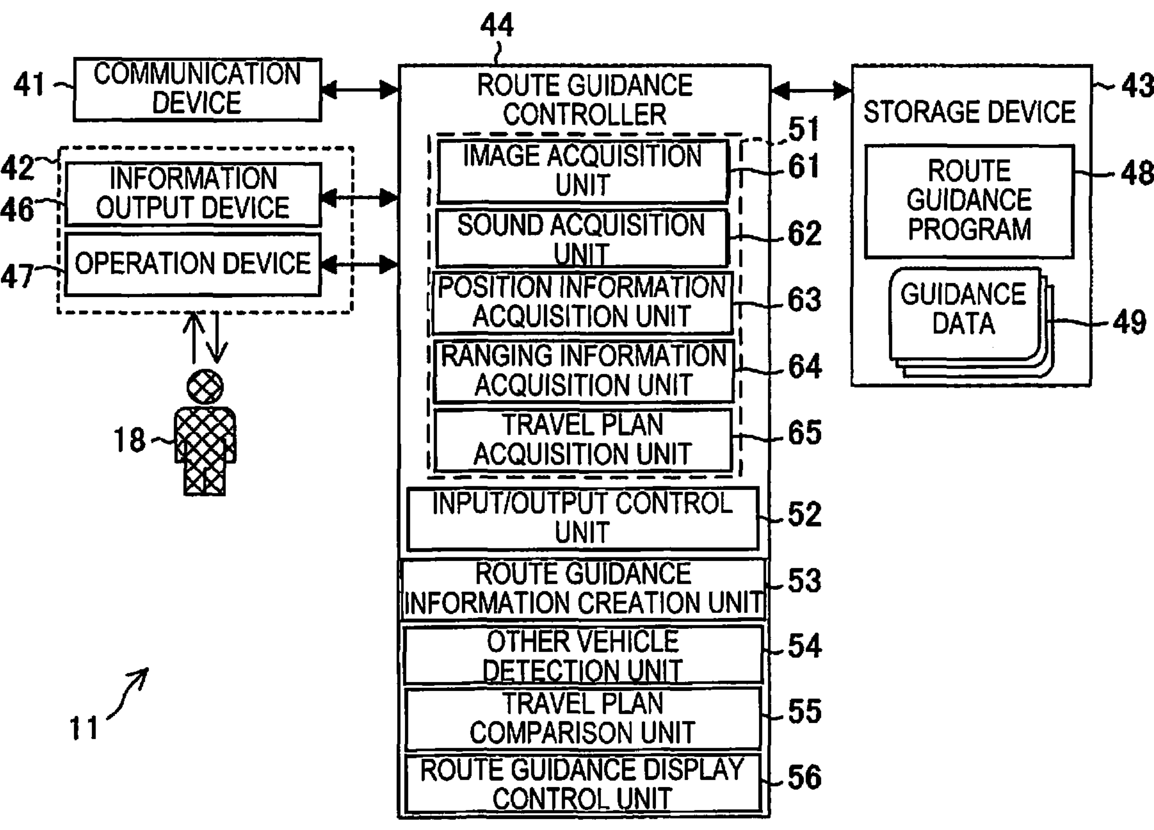

[FIG. 4]
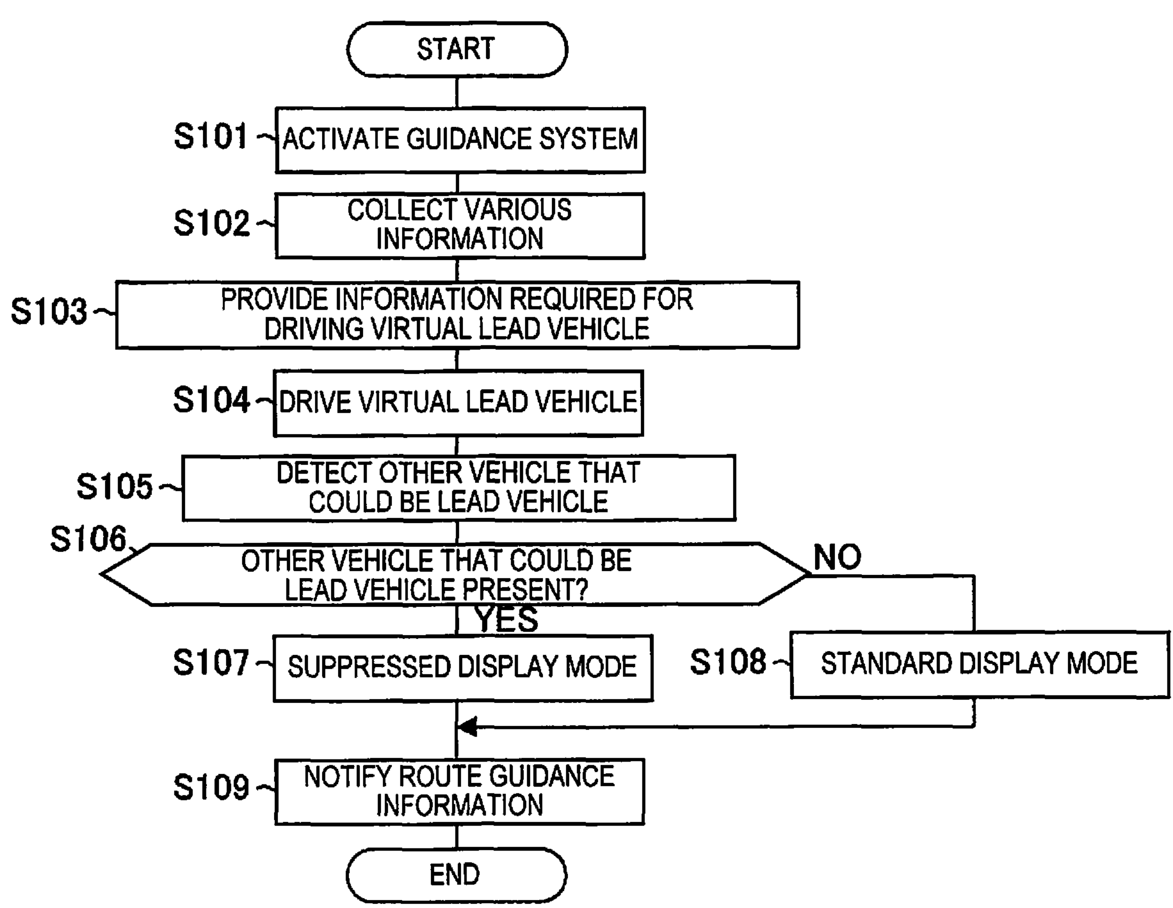

[FIG. 5]
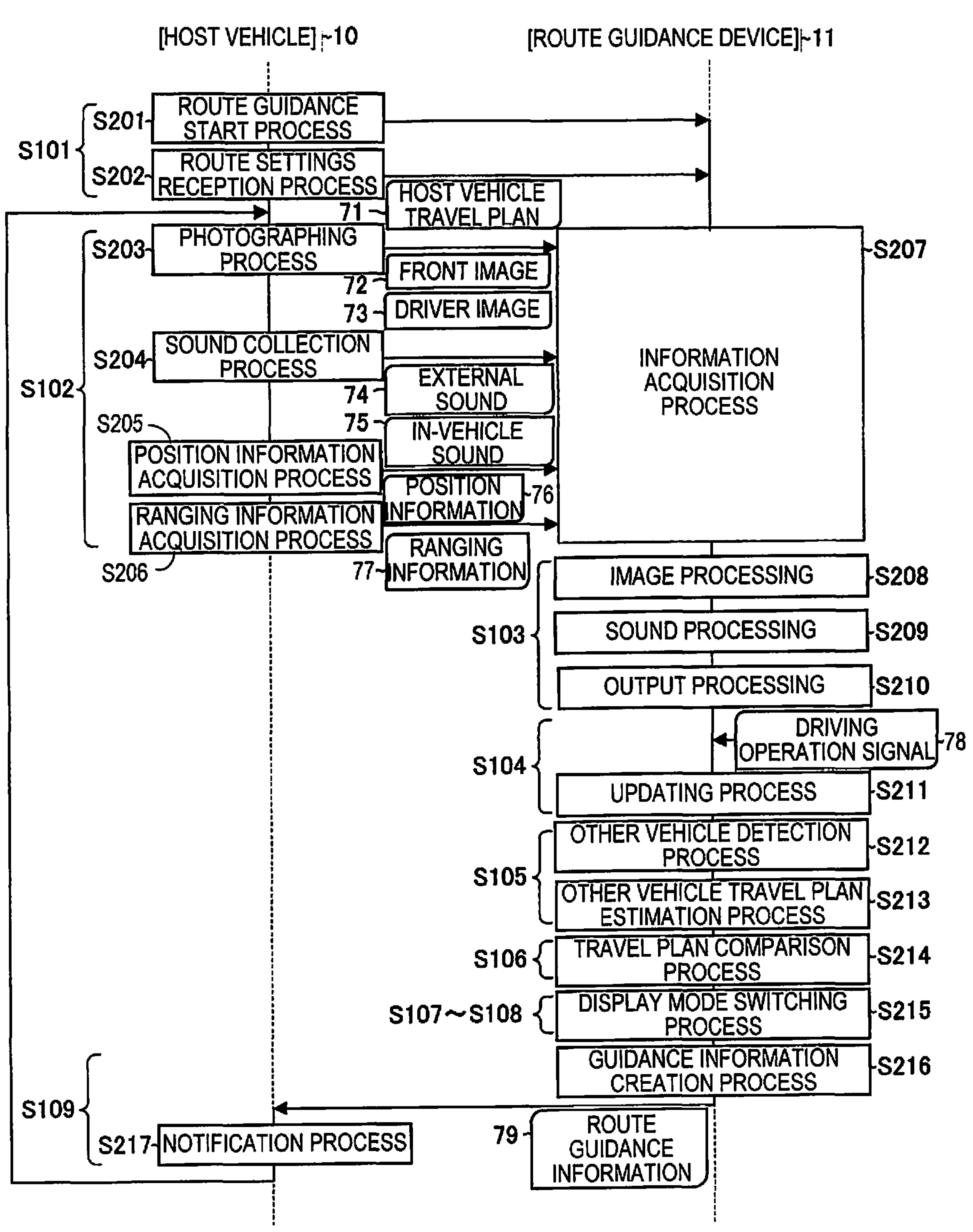

[FIG. 6]
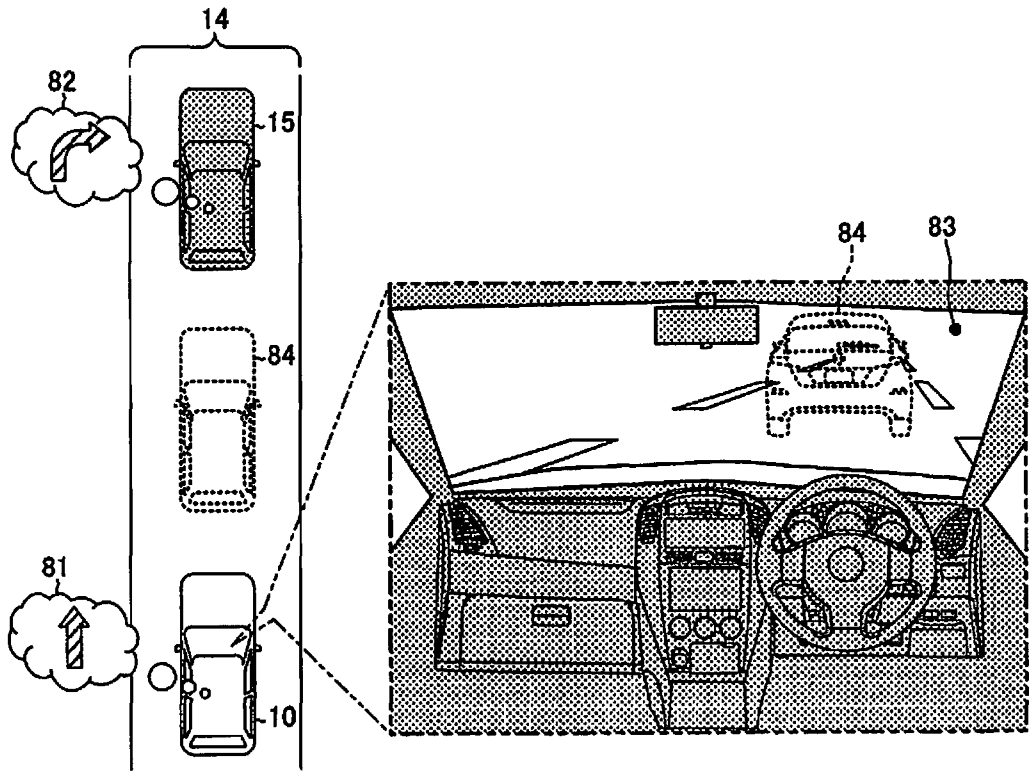
[FIG. 7]
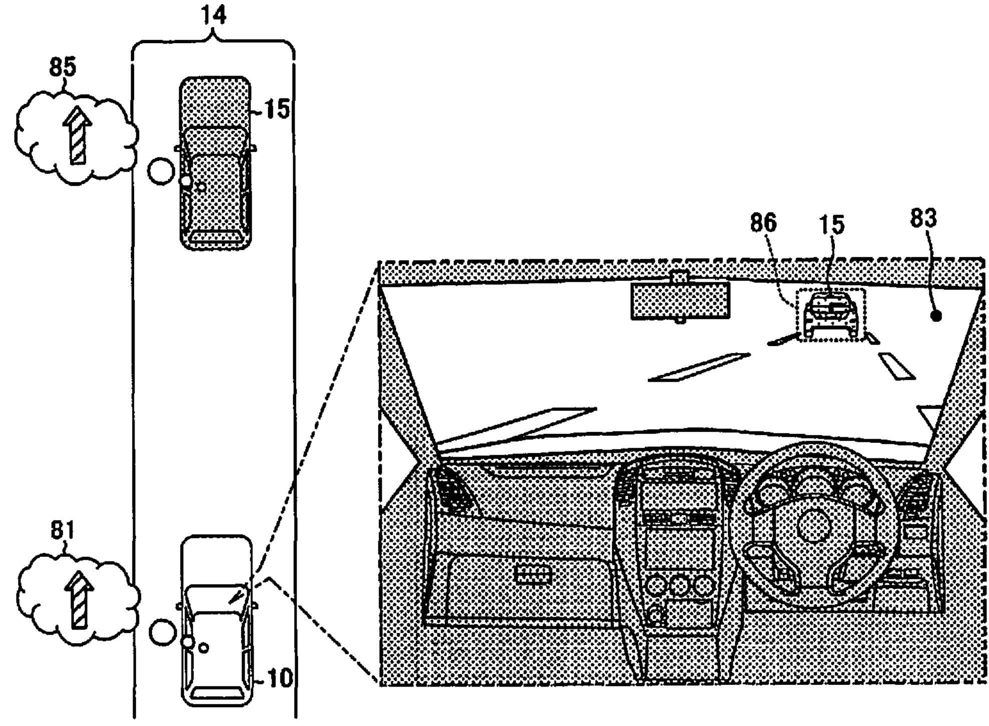

[FIG. 8]
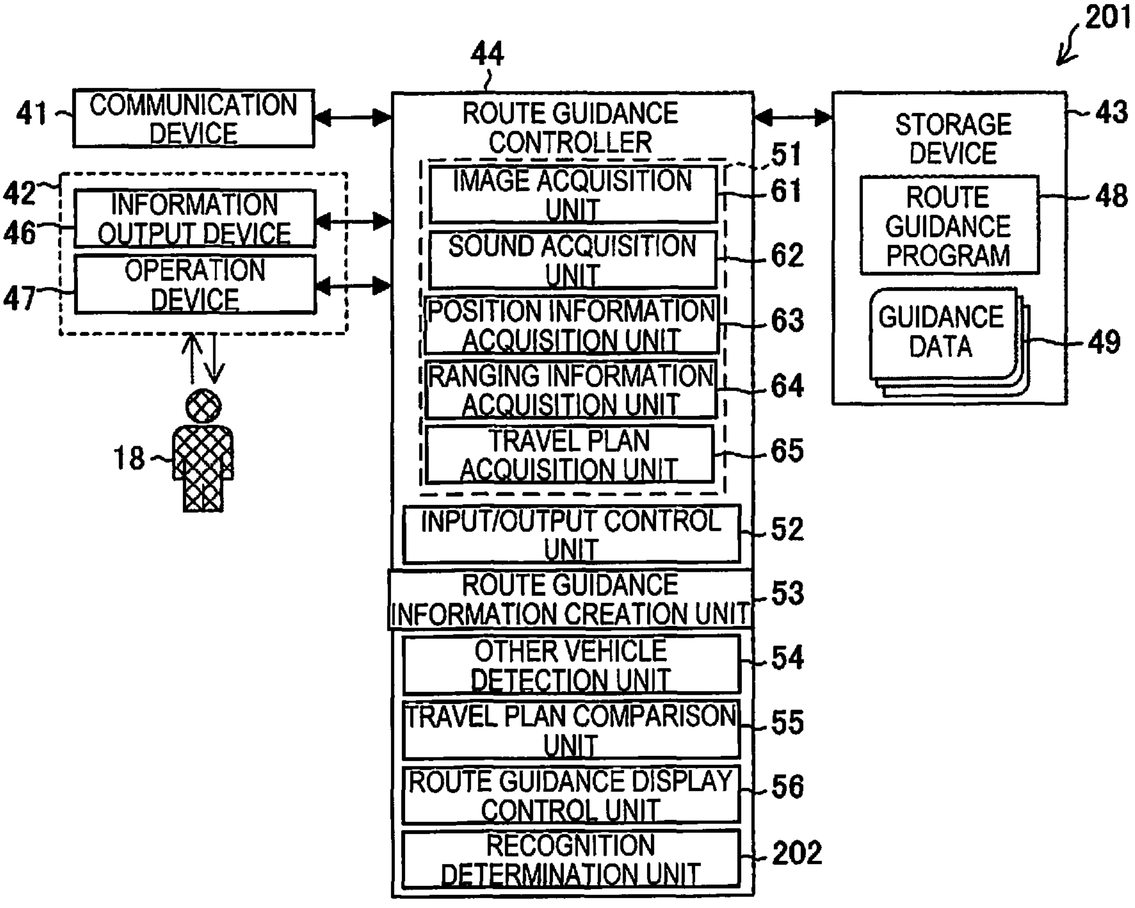
[FIG. 9]
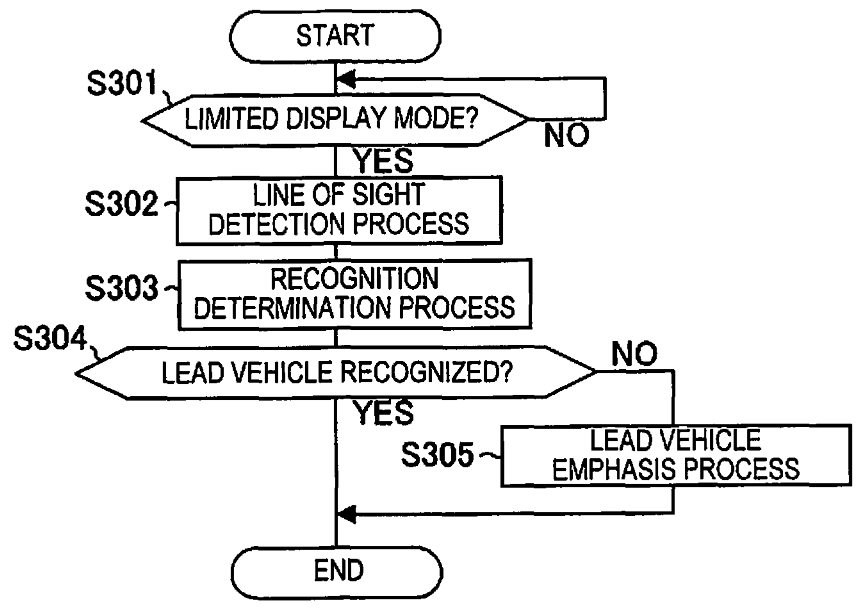

[FIG. 10]
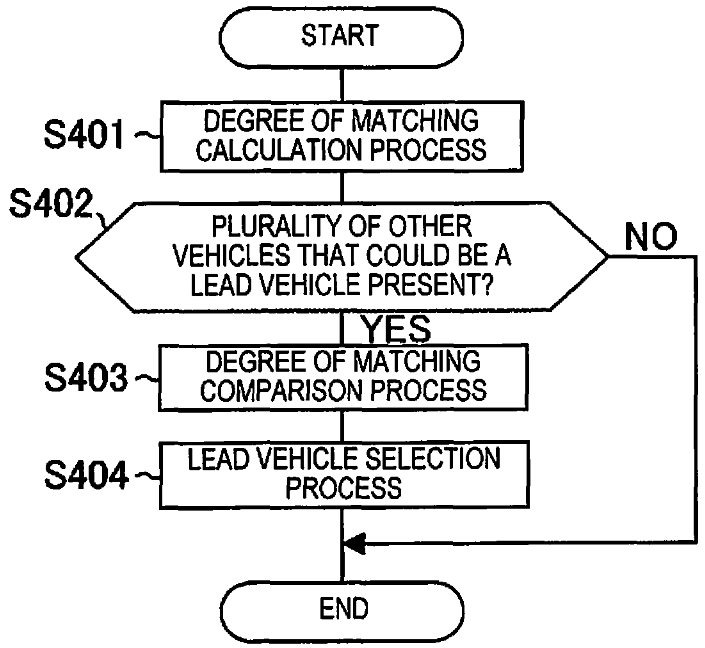
[FIG. 11]
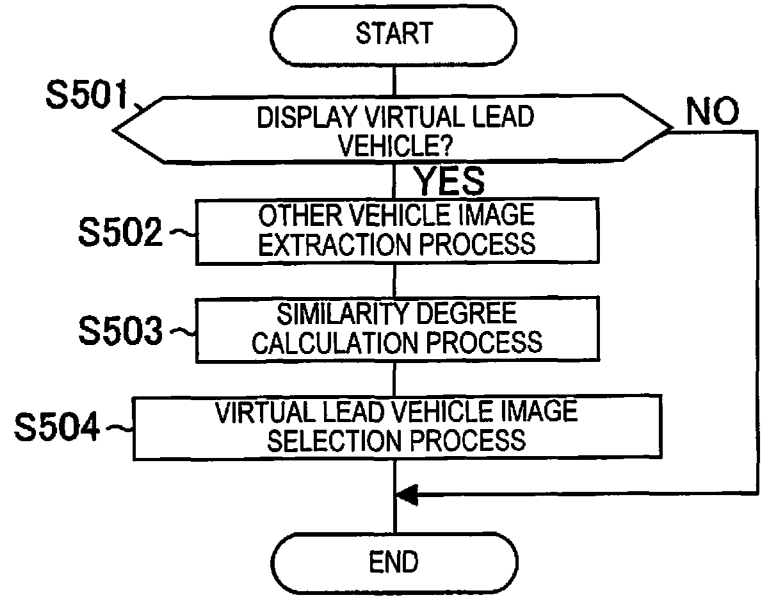

[FIG. 12]
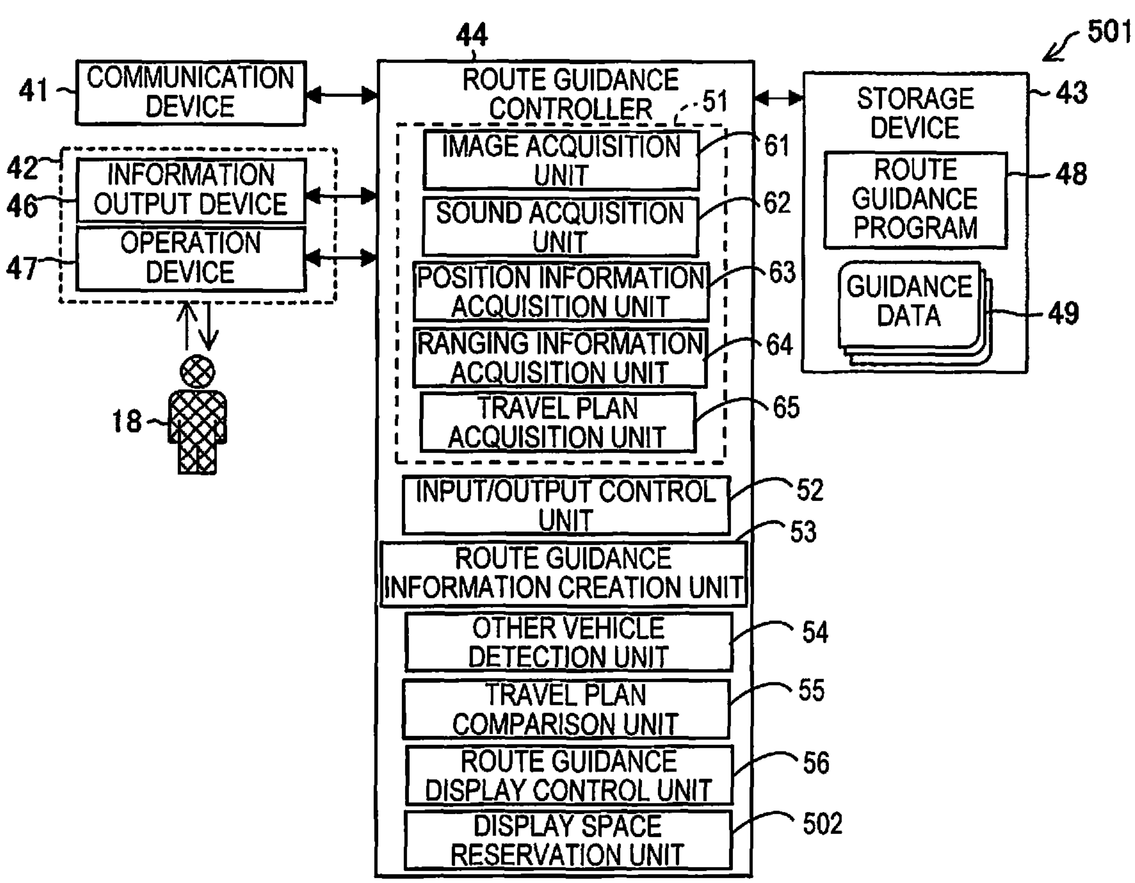

[FIG. 13]
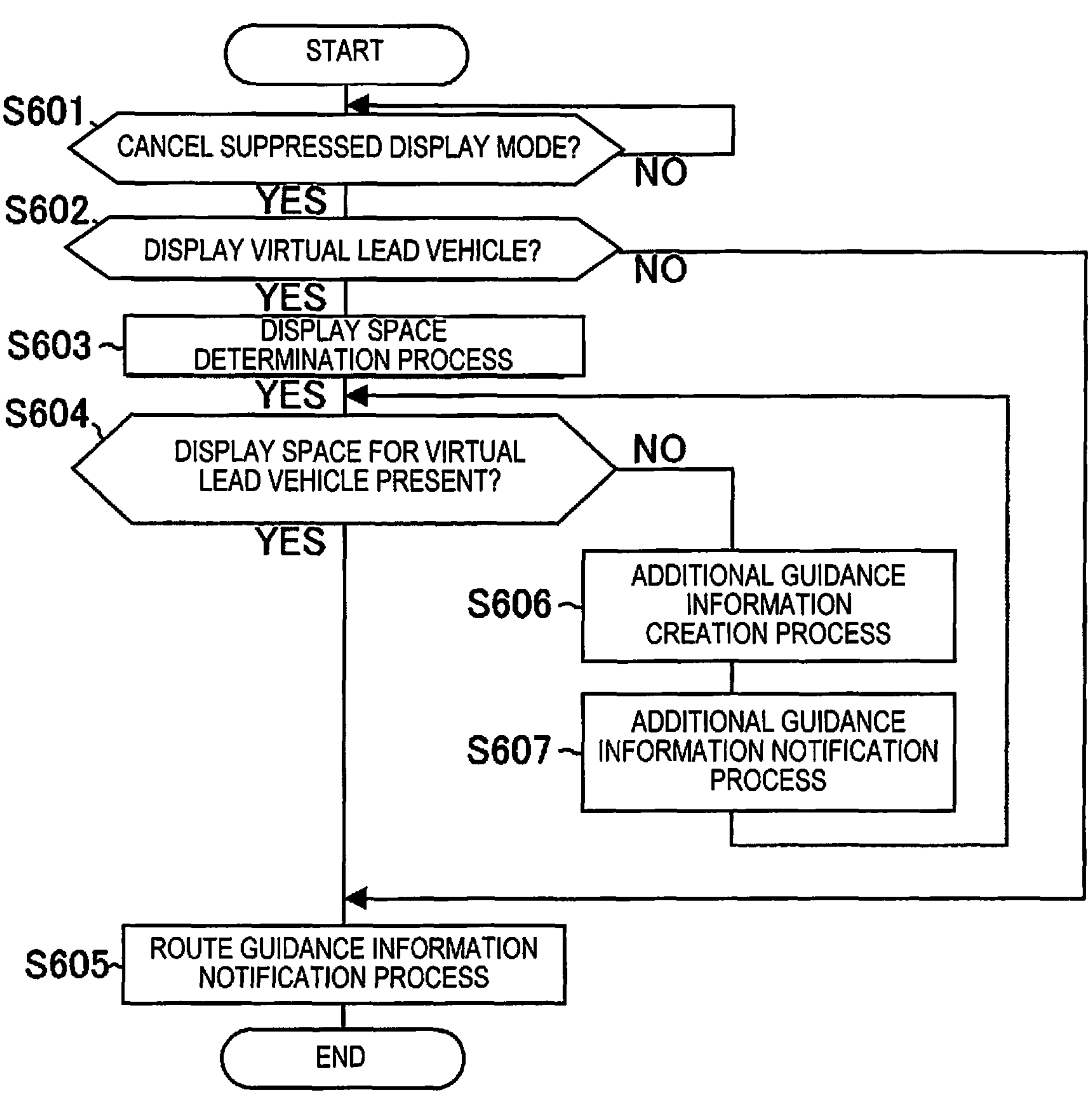

ROUTE GUIDE DEVICE, ROUTE GUIDE METHOD, AND ROUTE GUIDE PROGRAM THAT REDUCE ENERGY CONSUMPTION ASSOCIATED WITH ROUTE GUIDANCE DISPLAY

CROSS-REFERENCE TO RELATED APPLICATIONS

This application is a U.S. national stage application of International Application No. PCT/JP2021/015885, filed on Apr. 19, 2021.

BACKGROUND

Technical Field

The present invention relates to a route guidance device, a route guidance method, and a route guidance program that causes a vehicle to display route guidance.

Background Information

Japanese Laid-Open Patent Application No. 2019-184356A discloses a driving assistance device that uses a projector to display a virtual image of a virtual vehicle called a ghost car superimposed on an actual landscape to provide route guidance.

SUMMARY

The continuous display of the route guidance as described above requires a non-negligible amount of energy. Therefore, if the display of route guidance as described above is continued despite the need for the route guidance, energy may be unnecessarily consumed by a vehicle, etc.

Thus, an object of the present invention is to provide a route guidance device, a route guidance method, and a route guidance program that appropriately suppress the displaying of route guidance, according to necessity, by suppressing the wasteful energy consumption by a vehicle, etc.

BRIEF DESCRIPTION OF THE DRAWINGS

Referring now to the attached drawings which form a part of this original disclosure.

FIG. 1 is an explanatory diagram showing the schematized configuration of a route guidance system.

FIG. 2 is a block diagram showing the configuration of a vehicle that receives route guidance.

FIG. 3 is a block diagram showing the configuration of a route guidance device.

FIG. 4 is a flowchart showing the operation of the route guidance system.

FIG. 5 is a sequence chart of the processes executed by the route guidance system.

FIG. 6 is an explanatory diagram showing an example of the display of route guidance information when there is no other vehicle with a matching travel plan.

FIG. 7 is an explanatory diagram showing an example of the display of route guidance information when there is another vehicle with a matching travel plan.

FIG. 8 is a block diagram showing the configuration of the route guidance device according to a second embodiment.

FIG. 9 is a flowchart of the operations of the second embodiment.

FIG. 10 is a flowchart of the operations of a third embodiment.

FIG. 11 is a flowchart of the operations of a fourth embodiment.

FIG. 12 is a block diagram showing the configuration of the route guidance device according to a fifth embodiment.

FIG. 13 is a flowchart of the operations of the fifth embodiment.

DETAILED DESCRIPTION OF EMBODIMENTS

Embodiments of the present invention will be described below with reference to the drawings.

First Embodiment

FIG. 1 is an explanatory diagram showing the schematized configuration of a route guidance system 100. As shown in FIG. 1, the route guidance system 100 comprises a vehicle (hereinafter referred to as host vehicle 10) that receives route guidance from the route guidance system 100, and a route guidance device 11 that causes the host vehicle 10 to display information (hereinafter referred to as route guidance information 79 (see FIG. 5)) for route guidance.

The host vehicle 10 connects to the route guidance device 11 via a communication network 12. The host vehicle 10 transmits various information, is required for route guidance executed by the route guidance system 100, to the route guidance device 11. The various information required for route guidance is transmitted automatically or at the request of the route guidance system 11. The host vehicle 10 also receives the route guidance information 79 from the route guidance device 11. The route guidance information 79 that has been received is made known to the driver 13 of the host vehicle 10 by the host vehicle 10 displaying images, etc., and/or emitting sounds or voice notifications. The route guidance information 79 reported to the host vehicle 10 assists the driver 13 with the driving operations of the host vehicle 10 with respect to the selection of and modifications to the route. Therefore, the driver 13 can easily travel along a planned route by driving the host vehicle 10 according to the reported route guidance information 79.

The mode in which the host vehicle 10 makes the route guidance information 79 known can be arbitrarily set, but in the present embodiment, the host vehicle 10 reports a part or all of the route guidance information 79 by displaying an image or the like. In particular, in the present embodiment, the route guidance information 79 is, in principle, made known by the display of a virtual vehicle (hereinafter referred to as a virtual lead vehicle 84 (see FIG. 6)) that leads the host vehicle 10 with respect to the route in the field of view 83 of the driver 13. The route guidance information 79 can also be provided by sound or voice. However, instead of the virtual lead vehicle 84, the image of an arrow or the like that indicates the route to be taken by the host vehicle 10 can be displayed to make the route guidance information 79 known. The route guidance information 79 can also be provided using sound or voice instead of an image of the virtual lead vehicle 84, or the like. Of course, a plurality of types of images can be displayed to make the route guidance information 79 known, and sound or voice, etc., can be played together with the route guidance information.

The host vehicle 10 can be able to communicate directly or indirectly with another vehicle (hereinafter referred to as other vehicle 15) traveling in the vicinity of the host vehicle 10, such as another vehicle traveling on a road 14 on which the host vehicle is traveling, or another vehicle traveling in an adjacent lane. That is, the host vehicle 10 can carry out so-called inter-vehicle communication with the other vehicle 15, which is a different vehicle than the host vehicle 10. For this reason, when the other vehicle 15 is equipped with the equipment necessary for communication with the host vehicle 10, the host vehicle 10 can send and receive information necessary for route guidance carried out by the route guidance system 100 and/or other information by communicating with the other vehicle 15. For example, if the other vehicle 15 is so supported, the host vehicle 10 can obtain information from the other vehicle 15 pertaining to the route on which the other vehicle 15 plans to travel. The vicinity of the host vehicle 10 refers to a range of distances within which direct or indirect communication with the host vehicle 10, or detection, etc., by another method, is possible. Hereinafter, information pertaining to a route on which the other vehicle 15 plans to travel, that is, a travel plan representing the planned travel route of the other vehicle 15, is referred to as the other vehicle travel plan (not shown).

In addition, the host vehicle 10 can communicate with roadside infrastructure 16 provided on the road 14 on which the host vehicle travels. That is, the host vehicle 10 is capable of so-called vehicle-to-roadside communication. For this reason, the host vehicle 10 can communicate with the roadside infrastructure 16 as needed to obtain information required for the route guidance executed by the route guidance system 100 and/or other information. For example, the roadside infrastructure 16 provides information to the host vehicle 10, such as its own location, name of intersection, etc., When there is more than one roadside infrastructure 16, they may communicate with each other. The roadside infrastructure 16 may also act as a communication device that relays communications with the other vehicle 15 and other vehicles.

In addition, the host vehicle 10 can communicate with devices such as a smartphones in the possession of pedestrians and others. Therefore, the host vehicle 10 is capable of V2X (Vehicle-to-everything) communication and can acquire the information required for route guidance performed by the route guidance system 100 and/or other information from any communication-capable object in the vicinity of the host vehicle 10.

The route guidance device 11 uses the information obtained from the host vehicle 10 to create the route guidance information 79 and provides this information to the host vehicle 10. In the present embodiment, the route guidance device 11 is provided at a remote location 17, i.e., outside of the host vehicle 10. In addition, the route guidance device 11 creates the route guidance information 79 in accordance with an operation of an operator 18. That is, in the route guidance system 100 of the present embodiment, the driver 13 of the host vehicle 10 can in effect receive flexible and appropriate route guidance in real time from the operator 18 at the remote location 17. In the present embodiment, the operator 18 provides route guidance of the host vehicle 10 by driving the virtual lead vehicle 84. The driving of the virtual lead vehicle 84 means performing operations to adjust the position, size, orientation, etc., of the virtual lead vehicle 84 relative to the host vehicle 10 to be displayed in the host vehicle 10.

The route guidance device 11 can be installed in the host vehicle 10. In this case, the route guidance device 11 creates the route guidance information 79 mechanically by computation (for example, simulation), etc., using signals, information, etc., that can be acquired from the host vehicle 10 without relying on the operation of the operator 18.

FIG. 2 is a block diagram showing the configuration of a vehicle (host vehicle 10) that receives route guidance. As shown in FIG. 2, the host vehicle 10 is equipped with a position sensor 21, a range sensor 22, a photographing device 23, and a sound collection device 24, as devices used to acquire information pertaining to the host vehicle 10 as well as information inside and outside of the host vehicle 10.

The position sensor 21 detects the position of the host vehicle 10. The position sensor 21 is, for example, a GPS (Global Positioning System) sensor, etc. Data pertaining to the position of the host vehicle 10 detected by the position sensor 21 are referred to as position information 76 (see FIG. 5) below.

The range sensor 22 measures the position of and distance to an object, a person, etc., in the vicinity of the host vehicle 10. The range sensor 22 is, for example a LiDAR (Light Detection and Ranging) scanner, a millimeter wave radar, an ultrasonic sensor, or the like. The host vehicle 10 is provided with one or more range sensors 22 at arbitrary locations, such as the front, rear, and sides of the vehicle. In the present embodiment, the range sensor 22 detects at least the position of and the distance to the other vehicle 15. The data output by the range sensor 22 are referred to as ranging information 77 (see FIG. 5).

The photographing device 23 is composed of one or a plurality of cameras that photograph the inside and/or outside of the host vehicle 10. In the present embodiment, the photographing device 23 includes at least a front camera that takes pictures outside and in front of the host vehicle 10 and an interior camera that takes pictures of the interior of the host vehicle 10. The photographing range of the front camera includes at least part or all of the field of view of the driver 13 as the host vehicle 10 is driven. The photographing range of the interior camera includes the driver 13 to the extent that it is possible to detect transitions of the line of sight of the driver 13. Hereinafter, an image captured by the front camera and a video image consisting of images captured by the front camera are referred to as a front image 72 (see FIG. 5), and an image captured by the interior camera and a video image consisting of images captured by the interior camera are referred to as a driver image 73 (see FIG. 5).

The sound collection device 24 is composed of one or a plurality of microphones that collect sound or voice inside and/or outside of the host vehicle 10. In the present embodiment, the sound collection device 24 includes at least an exterior microphone that collects sounds or voices generated outside the host vehicle 10 and an interior microphone that collects the voice of the driver 13 and/or passengers (hereinafter referred to as the driver 13, etc.) of the host vehicle 10. For example, the exterior microphone collects driving or warning sounds emitted by another vehicle 15 and other vehicles, sounds or voices emitted by the road 14 and other facilities, or voices emitted by people in the vicinity of the host vehicle 10. Hereinafter, sound or voice data collected by the exterior microphone are referred to as external sound 74 (see FIG. 5). For example, the interior microphone collects the voice of the driver 13, etc., as well as other sounds inside the vehicle. The driver 13, etc., may input a voice command for issuing an instruction for an operation of the host vehicle 10 and/or the route guidance device 11. Therefore, the interior microphone may collect voice commands as well as ordinary conversation or solitary talking that is not intended as a command. In the present embodiment, the interior microphone collects at least the voice of the driver 13. The sound and/or voice data collected by the interior microphone are referred to as interior sound 75 (see FIG. 5).

In addition to the foregoing, the host vehicle 10 comprises an information input device 25, an information output device 26, and a driving control device 27 as driver 13 interfaces.

The information input device 25 is a user interface provided for operations by the driver 13, etc., and that is used for inputting various types of information to the host vehicle 10 and/or the route guidance device 11. The information input device 25 consists of a touch panel or mechanically operated buttons, etc., installed on the instrument panel, steering wheel, etc. Also, smartphones and other devices in the possession of the driver 13 or others that can communicate directly or indirectly with the host vehicle 10 (hereinafter referred to as user devices) may constitute the information input device 25. In the present embodiment, the information input device 25 is used at least to set or change the information pertaining to the route on which the host vehicle 10 plans to travel. Hereinafter, the information pertaining to the route on which the host vehicle 10 plans to travel, that is, the travel plan representing the planned travel route of the host vehicle 10 is referred to as the host vehicle travel plan 71 (see FIG. 5). The information input device 25 is also used to activate the route guidance system 100.

The information output device 26 is a user interface used to inform the driver 13, etc., of route guidance and other information by means of images (including moving images in addition to still images) and sound. The information output device 26 includes a display 28 and a speaker 29, for example. The display 28 conveys part or all of the route guidance and other information by means of images. For example, the display 28 can be provided on the instrument panel or steering wheel, and the user device may include the display 28. If the information input device 25 is configured with a touch panel or the like, the information input device 25 and the information output device 26 are in essence integrally configured. In particular, in the present embodiment, the display 28 is a HUD (head-up display). A HUD projects an image indirectly through the windshield, etc., or directly through the pupil of the driver 13 to display a virtual image representing information such as route guidance superimposed on the actual landscape, etc., within the field of view 83 of the driver 13. The virtual lead vehicle 84 displayed by the route guidance system 100 of the present embodiment as the route guidance information 79 is a virtual image displayed by the display 28, which is a HUD. In addition to being configured as an AR display device, which realizes so-called AR (augmented reality), like the HUD, the display 28 can be configured as a VR display device, which realizes VR (virtual reality), or as an MR display device, which realizes MR (mixed reality). The speaker 29 announces a part or all of the information, such as route guidance, by means of sound or voice.

The driving control device 27 is a basic user interface used for driving the host vehicle 10, such as a steering wheel, accelerator pedal, and brake pedal.

The host vehicle 10 is also equipped with a communication device 31, a vehicle controller 32, and a storage device 33.

The communication device 31 is an inter-device interface that under the control of the vehicle controller 32 connects to the route guidance device 11, the other vehicle 15, the roadside infrastructure 16, etc., via the communication network 12, and transmits and receives various information pertaining to route guidance, etc. For example, the host vehicle 10 uses the communication device 31 to communicate with the route guidance device 11 to transmit front images 72, driver images 73, exterior sound 74, interior sound 75, position information 76, and ranging information 77 in response to requests from the route guidance device 11, as required. The host vehicle 10 also uses the communication device 31 to receive the route guidance information 79 from the route guidance device 11. The host vehicle 10 may use the communication device 31 to access the other vehicle 15 or a server, etc., connected to the other vehicle 15 to obtain the travel plan, etc., of the other vehicle. In addition, the host vehicle 10 may use the communication device 31 to obtain or update map data 36 by connecting to a roadside infrastructure 16 or the like.

The vehicle controller 32 is a control unit that comprehensively controls various parts of the host vehicle 10. The vehicle controller 32 is made up of one or a plurality of computers and is provided with, for example, a central processing unit (CPU), random-access memory (RAM), an input/output interface (I/O interface), and the like. The vehicle controller 32 is programmed to perform various control functions pertaining to a route search as deemed necessary.

In the present embodiment, the vehicle controller 32 functions as a route guidance control unit 35 that executes at least control functions pertaining to route guidance. Control functions pertaining to route guidance include, for example, a route settings reception process, a route guidance start process, a route guidance information notification process, etc. The route settings reception process is a process in which the information input device 25 receives the settings of the host vehicle travel plan 71. The route guidance start process is a process for starting the route guidance of the route guidance system 100. The route guidance information notification process is a process in which the information output device 26 notifies the driver 13 and others of route guidance information 79.

The storage device 33 is composed of one or a plurality of storage devices or memory units. That is, the storage device 33 is RAM, ROM (Read-Only Memory), an HDD (Hard Disk Drive), an SSD (Solid-State Drive), or a combination thereof. The storage device 33 temporarily or permanently stores data, programs, etc., used for controlling the host vehicle 10. In the present embodiment, the storage device 33 stores the map data 36, a vehicle control program 37, and the like. As well as being used by the vehicle controller 32 for controlling the host vehicle 10, the map data 36 may also be provided to the route guidance device 11 in response to a request from the route guidance device 11. The vehicle controller 32 operates in accordance with the vehicle control program 37, thereby functioning as the route guidance control unit 35, etc.

FIG. 3 shows a block diagram of the configuration of the route guidance device 11. As shown in FIG. 3, the route guidance device 11 comprises a communication device 41, an input/output device 42, a storage device 43, and a route guidance controller 44.

The communication device 41 is an inter-device interface that connects to the host vehicle 10 via the communication network 12 under the control of the route guidance controller 44 and transmits and receives various information pertaining to route guidance. For example, the route guidance device 11 connects to the host vehicle 10 by means of the communication device 41 and receives route guidance starting instructions that are transmitted from the host vehicle 10 by the route guidance start process. Route guidance of the host vehicle 10 is thereby started. This causes the route guidance device 11 to transmit the route guidance information 79 to the host vehicle 10 via the communication device 41.

The input/output device 42 is an interface for the operator 18 and is equipped with an information output device 46 and an operating device 47.

The information output device 46 is an output interface of the route guidance device 11 and comprises, for example, a display that displays images, etc., and a speaker that reproduces sound or voice, etc. The information output device 46 displays the front images 72, driver images 73, and/or images generated from these images. An image generated from a front image 72 is, for example, an image generated by applying image processing to enlarge, transform, or otherwise process a portion of the forward image 72. In the present embodiment, an image from the viewpoint of the virtual lead vehicle 84 (hereinafter referred to as lead vehicle viewpoint image) is generated using a front image 72, which is displayed by the information output device 46. The information output device 46 also reproduces exterior sounds 74, interior sounds 75, or sounds generated using these sounds via a speaker. This allows the operator 18 to drive the virtual lead vehicle 84 as naturally if it were actually in front of the host vehicle 10 in order to lead the host vehicle 10 that follows.

The operating device 47 is an input interface of the route guidance device 11 and is operated by the operator 18. In the present embodiment, the operator 18 uses the operating device 47 to drive the virtual lead vehicle 84. Therefore, the operating device 47 is a device that imitates a steering wheel, an accelerator pedal, a brake pedal, and the like, or a control panel of a consumer game console consisting of directional keys and buttons.

The storage device 43 is composed of one or a plurality of storage devices or memory units. That is, the storage device 43 is, for example, RAM, ROM, an HDD, an SSD, or a combination thereof. The storage device 43 temporarily or permanently stores the data, programs, etc., used for controlling the route guidance controller 44 as well as for route guidance. In the present embodiment, the storage device 43 stores a route guidance program 48 and guidance data 49. The route guidance controller 44 operates in accordance with the route guidance program 48 to realize various functions for providing route guidance to the host vehicle 10. The guidance data 49 are images, sounds, etc., to be reported to the host vehicle 10 as the route guidance information 79. In the present embodiment, the guidance data 49 are image data of the virtual lead vehicle 84, etc., and voice data that include prescribed messages, etc. In the present embodiment, among the image data, the image data that are displayed virtually in the field of view 83 of the driver 13 by displaying virtual images, such as the images of the virtual lead vehicle 84, are referred to as virtual images. Further, the guidance data 49 include image data of multiple types of virtual lead vehicles 84 that differ in vehicle type, shape, etc. The guidance data 49 can be obtained and updated as necessary via the web, for example.

The route guidance controller 44 is a control device that comprehensively controls each unit of the route guidance device 11 to provide route guidance information 79 to the host vehicle 10 in real time. The route guidance controller 44 is composed of one or a plurality of computers and is provided with a central processing unit (CPU), random access memory (RAM), and an input/output interface (I/O interface), for example. Further, the route guidance controller 44 is programmed to perform various control functions pertaining to a route search as deemed necessary.

In the present embodiment, in order to realize route guidance of the host vehicle 10, the route guidance controller 44 functions as an information acquisition unit 51, an input/output control unit 52, a route guidance information creation unit 53, an other vehicle detection unit 54, a travel plan comparison unit 55, and a route guidance display control unit 56.

The information acquisition unit 51 acquires various types of information required for route guidance from the host vehicle 10 for the purpose of route guidance. More specifically, the information acquisition unit 51 includes an image acquisition unit 61, a sound acquisition unit 62, a position information acquisition unit 63, a ranging information acquisition unit 64, and a travel plan acquisition unit 65.

The image acquisition unit 61 appropriately acquires the front image 72 and driver image 73 from the host vehicle 10 as needed. The sound acquisition unit 62 appropriately acquires the exterior sound 74 and interior sound 75 from the host vehicle 10 as needed. The position information acquisition unit 63 appropriately acquires the position information 76 from the host vehicle 10 as needed. The ranging information acquisition unit 64 appropriately acquires the ranging information 77 from the host vehicle 10 as needed.

The travel plan acquisition unit 65 acquires the respective travel plans of the host vehicle 10 and the other vehicle 15. That is, the travel plan acquisition unit 65 acquires the host vehicle travel plan 71, which is the travel plan of the host vehicle 10, and the other vehicle travel plan, which is the travel plan of the other vehicle 15. The host vehicle travel plan 71 that is acquired is preset in the host vehicle 10.

When the travel plan set by another vehicle can be obtained from another vehicle 15 by communication with the host vehicle 10, etc., the travel plan acquisition unit 65 acquires the travel plan of the other vehicle by means of this method. On the other hand, when the travel plan set by another vehicle cannot be obtained from other vehicle 15 by communication with the host vehicle 10, etc., the travel plan acquisition unit 65 acquires the travel plan of the other vehicle by estimation. That is, the travel plan acquisition unit 65 executes an other vehicle travel plan estimation process for estimating the vehicle travel plan of the other vehicle using, for example, the front image 72 and/or the ranging information 77, as needed. For example, it is possible to determine that a change will occur in the travel route of the other vehicle 15 and the direction, etc., of the travel route after the change based on such signals as transition of position information of the other vehicle 15 based on the ranging information 77, the turning on or flashing of a turn signal lamp (direction indicator lamp) of the other vehicle 15 as captured in the front image 72, the turning on of the brake lamps of the other vehicle 15 as captured in the front image 72, and the like. Therefore, in the present embodiment, the travel plan acquisition unit 65 estimates the travel plan of the other vehicle 15 based on at least one of the following: the position information of the other vehicle 15, a turn signal lamp of the other vehicle 15, and the brake lamps of the other vehicle 15.

The input/output control unit 52 controls the output to the information output device 46 and the input from the operating device 47. For example, the input/output control unit 52 generates a lead vehicle viewpoint image by applying image processing to front image 72 and causes the information output device 46 to display this image. The input/output control unit 52 causes the information output device 46 to reproduce exterior sound 74, and other sounds outside the vehicle. The input/output control unit 52 also receives input operations by means of the operating device 47 and updates the contents of the route guidance information 79 to be displayed in the host vehicle 10 based on the contents of the input operation. In the present embodiment, the input/output control unit 52 receives input signals (hereinafter referred to as driving operation signals 78 (see FIG. 5)) input from the operating device 47 related to the driving operation of the virtual lead vehicle 84 and updates the position, size, orientation, etc., of the virtual lead vehicle 84 to be displayed in the host vehicle 10 as needed.

The route guidance information creation unit 53 creates the route guidance information 79 based on input operations using the operating device 47. In the present embodiment, the route guidance information creation unit 53 sequentially creates the route guidance information 79 representing the position, size, orientation, etc., of the virtual lead vehicle 84 to be displayed in the host vehicle 10 based on the driving operation signals 78 of the virtual lead vehicle 84.

The route guidance information creation unit 53 selects appropriate image data of the virtual lead vehicle 84 from the plurality of image data of the virtual lead vehicles 84 included in the guidance data 49 and creates the route guidance information 79 including the selected image data of the virtual lead vehicle 84.

The other vehicle detection unit 54 detects the other vehicle 15 in the vicinity of the host vehicle 10 based on front image 72 and/or the ranging information 77. In the present embodiment, the other vehicle 15 detected by the other vehicle detection unit 54 is a vehicle that could be a lead vehicle of the host vehicle 10. Therefore, the other vehicle detection unit 54 detects at least the other vehicle 15 traveling ahead of the host vehicle 10. The travel plan acquisition unit 65 acquires the other vehicle travel plan with regard to the other vehicle 15 that could become a lead vehicle of the host vehicle 10 detected by the other vehicle detection unit 54.

The travel plan comparison unit 55 compares the host vehicle travel plan 71, which is the travel plan of the host vehicle 10, and the other vehicle travel plan, which is the travel plan of the other vehicle 15. This comparison of travel plans is carried out by calculating a degree to which the host vehicle travel plan 71 and the other vehicle travel plan match. The longer the overlapping segment between the travel route of the host vehicle 10, as represented by the host vehicle travel plan 71, and the travel route of the other vehicle 15, as represented by the other vehicle travel plan, beginning at the time point (location) of comparison, the higher the calculated value of the degree of matching. In the comparison of the host vehicle travel plan 71 and the other vehicle travel plan, that the host vehicle travel plan 71 and the other vehicle travel plan "match" means that the degree of matching exceeds or is equal to a prescribed threshold value. Therefore, that the host vehicle travel plan 71 and the other vehicle travel plan do "not match" means that the degree of matching between the two is below this threshold value.

The route guidance display control unit 56 controls the display mode of the route guidance information 79 in the host vehicle 10 in accordance with the result of comparing the host vehicle travel plan 71 and the other vehicle travel plan. The route guidance display control unit 56 controls the display mode of the route guidance information 79 in the host vehicle 10 by including or attaching a signal specifying the display mode in the route guidance information 79 that is transmitted to the host vehicle 10.

More specifically, the route guidance display control unit 56 causes the host vehicle 10 to display the route guidance information 79 at least when the host vehicle travel plan 71, which is the travel plan of the host vehicle 10, and the other vehicle travel plan, which is the travel plan of the other vehicle 15, do not match. For example, if no other vehicle 15 is ahead of the host vehicle 10 with a driving plan that matches that of the host vehicle 10, then there is not an actual vehicle that could lead the host vehicle 10 along the route. For this reason, the route guidance display control unit 56 causes the host vehicle 10 to display the route guidance information 79 without any restrictions pertaining to the display mode of the content of the route guidance information 79 reported by means of the display, for example. As a result, the route guidance device 11 provides route guidance to the host vehicle 10.

On the other hand, when the host vehicle travel plan 71, which is the travel plan of the host vehicle 10, and the other vehicle travel plan, which is the travel plan of the other vehicle 15, do match, the route guidance display control unit 56 causes the display of a part or all of the route guidance information 79 to be suppressed. For example, if the other vehicle 15 is there, ahead of the host vehicle 10 with a travel plan that matches that of the host vehicle 10 to at least a certain degree, the other vehicle 15 could be an actual vehicle that could lead the host vehicle 10 along the route. That is, the host vehicle 10 can follow its own vehicle travel plan 71 simply by following the other vehicle 15 without having to display the route guidance information 79. Thus, the route guidance display control unit 56 suppresses the display of the route guidance information 79 by reducing, simplifying, or prohibiting the display of the content of the route guidance information 79 that is made known by virtue of its display. As a result, the energy that is consumed by the host vehicle 10 can be reduced by continuing to display the route guidance information 79.

"Reducing" the display of the route guidance information 79 means not displaying a part of the contents, or decreasing the display density, display brightness, etc., of part or all of the contents. For example, changing the display of the virtual lead vehicle 84 to be lighter than usual constitutes a reduction of the route guidance information 79.

"Simplifying" the display of the route guidance information 79 means changing part or all of the specific display contents to reduce the amount of the display. For example, changing the virtual lead vehicle 84 so that its interior appears empty and displaying only its outer contours simplifies the display of the route guidance information 79. Further, changing the display to hide the virtual lead vehicle 84 and instead displaying information that identifies the other vehicle 15 simplifies the route guidance information 79. Information that identifies the other vehicle 15 acting as the lead vehicle is information (hereinafter referred to as lead vehicle identification information) that identifies said other vehicle 15 as a lead vehicle that is leading the host vehicle 10. The lead vehicle identification information acts as an instruction to follow the other vehicle 15, which serves as a lead vehicle. The display of the route guidance information 79 can be reduced and simplified.

"Prohibiting" the display of the route guidance information 79 means not displaying any of the contents that are reported by the display. For example, when the display of the route guidance information 79 is prohibited, the display of the virtual lead vehicle 84 and the other route guidance information 79 will disappear, and route guidance will be performed only by means of voice.

In the present embodiment, the route guidance display control unit 56 causes the host vehicle 10 to display the virtual lead vehicle 84 when there is no other vehicle 15 with a matching travel plan. On the other hand, when there is another vehicle 15 with a matching travel plan that could be a lead vehicle, the position, etc., of the other vehicle 15 is displayed and the display of the virtual lead vehicle 84 is stopped. That is, in the present embodiment, the display of the route guidance information 79 is simplified by the continued display the route guidance information 79, which reduces energy consumption.

Hereinafter, the display mode in which the route guidance display control unit 56 causes the route guidance information 79 to be displayed in the host vehicle 10 when the host vehicle travel plan 71 and the other vehicle travel plan do not match is referred to as the "standard display mode." Further, the display mode in which the route guidance display control unit 56 causes the route guidance information 79 to be displayed in the host vehicle 10 in a form in which the display of a part or all of the route guidance information 79 is suppressed when the host vehicle travel plan 71 and the other vehicle travel plan match is referred to as the "suppressed display mode." That is, the route guidance display control unit 56 switches the mode in which the host vehicle 10 is made to display the route guidance information 79 between the standard display mode and the suppressed display mode in accordance with the host vehicle travel plan 71 and the other vehicle travel plan.

FIG. 4 shows a flowchart of the operation of the route guidance system 100. As shown in FIG. 4, in Step S101, the route guidance system 100 is activated, for example, when the driver 13 of the host vehicle 10 uses the information input device 25 to perform an operation to start route guidance. Further, when starting the route guidance by the route guidance system 100, the driver 13 sets the host vehicle travel plan 71.

Once the route guidance system 100 is activated and the host vehicle travel plan 71 is set, in Step S102, the host vehicle 10 collects various information required for route guidance and transmits this information to the route guidance device 11 at a remote location 17. As a result, in Step S103, the route guidance device 11 generates and displays the lead vehicle viewpoint image and reproduces exterior sound 74, etc. As a result, it is possible to provide the operator 18 with information required for driving the virtual lead vehicle 84. In response, the operator 18 drives the virtual lead vehicle 84, and, in Step S104, the route guidance device 11 receives the input of the driving operation signals 78 of the virtual lead vehicle 84. The route guidance information 79 to be displayed in the host vehicle 10 is then created in accordance with the driving operation signals 78.

On the other hand, in Step S105, the route guidance device 11 detects whether there is another vehicle 15 that could act as a lead vehicle by comparing the host vehicle travel plan 71 and the other vehicle travel plan. As a result, if it is determined in Step S106 that there is another vehicle 15 that could serve as a lead vehicle, in Step S107, the route guidance device 11 sets the display mode for displaying the route guidance information 79 in the host vehicle 10 to the suppressed display mode. On the other hand, in Step S106, if it is determined that there is not another vehicle 15 that could be a lead vehicle, in Step S108, the route guidance device 11 sets the display mode for displaying the route guidance information 79 in the host vehicle 10 to the standard display mode.

Then, in Step S109, the host vehicle 10 is notified of the route guidance information 79. At this time, the contents of the route guidance information 79 that should be displayed on the display 28 are displayed in the display mode specified by the route guidance device 11. That is, when the other vehicle 15 could be a lead vehicle of the host vehicle 10, the display of the route guidance information 79 is reduced, simplified, or prohibited. As a result, the energy associated with displaying the route guidance information 79 is reduced. On the other hand, when there is no other vehicle 15, or when the other vehicle 15 cannot be a lead vehicle of the host vehicle 10, the route guidance information 79 is displayed without being suppressed, and a relatively detailed route guidance is provided.

FIG. 5 is a sequence chart of the process executed by the route guidance system 100. As shown in FIG. 5, more specifically, Step S101, in which the route guidance system 100 is activated, includes the route guidance starting process of Step S201 and the route settings reception process of Step S202 carried out by the host vehicle 10. The route guidance starting process sends a request to the route guidance device 11 to start route guidance. This causes the route guidance device 11 to start the route guidance process. In addition, the host vehicle travel plan 71 is set and transmitted to the route guidance device 11 by the route settings reception process.

Further, the collection of various information required for route guidance in Step S102 includes the photographing process of Step S203, the sound collection process of Step S204, the position information acquisition process of Step S205, the ranging information acquisition process of Step S206, and the information acquisition process of Step S207. In the photographing process of Step S203, the host vehicle 10 uses the photographing device 23 to acquire the front image 72 and driver image 73. In the sound collection process of Step S204, the host vehicle 10 uses the sound collection device 24 to acquire the exterior sound 74 and interior sound 75. In the position information acquisition process of Step S205, the host vehicle 10 uses the position sensor 21 to acquire the position information 76. In the ranging information acquisition process of Step S206, the host vehicle 10 uses the range sensor 22 to acquire the ranging information 77. Then, by means of the information acquisition process of Step S207, the route guidance device 11 acquires the various information collected by the host vehicle 10, as appropriate. In particular, in Step S207, the route guidance device 11 acquires the host vehicle travel plan 71 by means of the travel plan acquisition unit 65. In addition, if in Step S207 the host vehicle 10 had obtained the other vehicle travel plan, the route guidance device 11 acquires the other vehicle travel plan by means of the travel plan acquisition unit 65. In the present embodiment, it is assumed that the host vehicle 10 has not acquired the other vehicle travel plan.

The provision of information required for driving the virtual lead vehicle 84 in Step S103 includes the image processing of Step S208, the sound processing of Step S209, and the output processing of Step S210. In the image processing of Step S208, the route guidance device 11 transforms, for example, part or all of the front image 72 using the input/output control unit 52 to generate the lead vehicle viewpoint image. In the sound processing of Step S209, the route guidance device 11 adjusts the volume, etc., of the exterior sound 74, for example, using the input/output control unit 52, and reduces the noise. The reduction processing, etc., is adjusted. The sound processing of Step S209 is executed as deemed necessary, and can be omitted. In the output processing of Step S210, the route guidance device 11 outputs the lead vehicle viewpoint image and the exterior sound 74 to the information output device 46 using the input/output control unit 52. This allows the operator 18 to drive the virtual lead vehicle 84 from that viewpoint.

The driving of the virtual lead vehicle of Step S104 includes a step for the route guidance device 11 to receive the input of the driving operation signal 78 and the updating process of Step S211. When the operator 18 drives the virtual lead vehicle 84, the position, etc., of the virtual lead vehicle 84 relative to the host vehicle 10 must change. Therefore, in the updating process of Step S211, the route guidance device 11 appropriately updates the position, size, orientation, etc., of the virtual lead vehicle 84 to be displayed in the host vehicle 10 based on the driving operation signal 78 using the input/output control unit 52.

The detection of the other vehicle 15 in Step S105 includes the other vehicle detection process in Step S212 and the other vehicle travel plan estimation process in Step S213. In the other vehicle detection process of Step S212, the route guidance device 11 detects the presence of the other vehicle 15 using the other vehicle detection unit 54. Then, in the other vehicle travel plan estimation process of Step S213, the route guidance device 11 estimates the other vehicle travel plan of the detected other vehicle 15 using the travel plan acquisition unit 65. The other vehicle travel plan estimation process of Step S213 is omitted with respect to the other vehicle 15 for which the host vehicle 10 has acquired the travel plan.

The determination of Step S106 is, specifically, the travel plan comparison process of Step S214, which is executed by the route guidance device 11 using the travel plan comparison unit 55. In the travel plan comparison process of Step S214, the degree of matching between the host vehicle travel plan 71 and the other vehicle travel plan, which has been acquired or estimated, is calculated and compared with a prescribed threshold value. If the calculated degree of matching exceeds or is equal to the prescribed threshold value, it is then determined that the host vehicle travel plan 71 and the other vehicle travel plan match. Also, another vehicle 15 with a travel plan that matches that of the host vehicle 10 could be a lead vehicle of the host vehicle 10. Therefore, of the detected other vehicles 15, the other vehicle 15 with the greatest degree of matching between the host vehicle travel plan 71 and the other vehicle travel plans exceeding or equal to the prescribed threshold value is determined to be the other vehicle 15 that could be a lead vehicle of the host vehicle 10.

The switching of the display mode of Step S107 and Step S108 is realized by means of the display mode switching process of Step S215. In the display mode switching process of Step S215, the route guidance device 11 uses the route guidance display control unit 56 to switch the mode in which the host vehicle 10 is caused to display the route guidance information 79 between the standard display mode and the suppressed display mode.

The notification of the route guidance information 79 in Step S109 includes the route guidance information creation process of Step S216 and the notification process of Step S217. In the route guidance information creation process of Step S216, the route guidance device 11 creates the route guidance information 79 using the route guidance information creation unit 53 and includes or appends a signal specifying the display mode, which information and signal are transmitted to the host vehicle 10. In the notification process of Step S217, the host vehicle 10 notifies the driver 13 of the route guidance information 79 that has been received using the information output device 26. At this time, the contents of the route guidance information 79 that are to be displayed on the display 28 are displayed in the specified display mode.

FIG. 6 is an explanatory diagram showing a display example of the route guidance information 79 when there is no other vehicle 15 that has a matching travel plan. As shown in FIG. 6, it is assumed that other vehicle 15 is there, ahead of the host vehicle 10. As indicated by arrow 81, the host vehicle 10 intends to pass directly through the next intersection. On the other hand, as indicated by arrow 82, the other vehicle 15 is planning to turn right at the intersection. Therefore, the host vehicle travel plan 71 and the other vehicle travel plan of this other vehicle 15 do not match. For this reason, the route guidance device 11 sets the display mode of the route guidance information 79 to the standard display mode. As a result, the host vehicle 10 displays a virtual lead vehicle 84 operated by the operator 18 in the field of view 83 of the driver 13. Thus, the host vehicle 10 follows the virtual lead vehicle 84 and is guided to pass directly through the next intersection.

FIG. 7 is an explanatory diagram showing a display example of the route guidance information 79 when there is another vehicle 15 with a matching travel plan. As shown in FIG. 7, it is assumed that the other vehicle 15 is there, ahead of the host vehicle 10. As indicated by arrow 81, the host vehicle 10 intends to pass directly through the next intersection. Here, as indicated by an arrow 85, like the host vehicle 10, the other vehicle 15 is also planning to pass directly through the next intersection. Therefore, the host vehicle travel plan 71 and the other vehicle travel plan of this other vehicle 15 match at least over the path through the next intersection, so that the other vehicle 15 could be a lead vehicle of the host vehicle 10. For this reason, the route guidance device 11 sets the display mode of the route guidance information 79 to the suppressed display mode. As a result, the host vehicle 10 does not display the virtual lead vehicle 84 in the field of view 83 of the driver 13, but instead simply indicates that the other vehicle 15 could be a lead vehicle, for example, by means of frame lines 86. That is, the frame lines 86 are lead vehicle identification information and act as an instruction that the other vehicle 15, which is to be the lead vehicle, is to be followed. The host vehicle 10 thus follows the other vehicle 15 and is guided to pass directly through the next intersection. In addition, the energy associated with displaying the route guidance information 79 is reduced in the host vehicle 10.

As described above, the route guidance device 11 according to the first embodiment causes the host vehicle 10 to display the route guidance information 79 for route guidance. The route guidance device 11 includes the travel plan acquisition unit 65, the travel plan comparison unit 55, and the route guidance display control unit 56. The travel plan acquisition unit 65 acquires travel plans (host vehicle travel plan 71 and other vehicle travel plan) respectively representing the travel route plan of the host vehicle 10 and of the other vehicle 15, which is a vehicle different from the host vehicle 10. The travel plan comparison unit 55 compares the host vehicle travel plan 71, which is the travel plan of the host vehicle 10, and the other vehicle travel plan, which is the travel plan of the other vehicle 15. The route guidance display control unit 56 causes the host vehicle 10 to display the route guidance information 79 at least when the host vehicle travel plan 71, which is the travel plan of the host vehicle 10, and the other vehicle travel plan, which is the travel plan of the other vehicle 15, do not match. In addition, when the host vehicle travel plan 71, which is the travel plan of the host vehicle 10, and the other vehicle travel plan, which is the travel plan of the other vehicle 15, do match, the route guidance display control unit 56 causes the display of a part or all of the route guidance information 79 to be suppressed.

By means of this configuration, the route guidance device 11 determines whether there is another vehicle 15 that could be a lead vehicle of the host vehicle 10. When it can be determined that there is another vehicle 15 that could be a lead vehicle and that the display of the route guidance information 79 is not necessarily required, the display of the route guidance information 79 is suppressed. Therefore, the route guidance device 11 can appropriately suppress the display of the route guidance information 79 in accordance with the specific circumstances of the host vehicle 10 while providing appropriate route guidance to the host vehicle 10 and suppressing the energy consumed for displaying the route guidance information 79.

In the route guidance device 11 according to the first embodiment, the route guidance display control unit 56 causes the host vehicle 10 to display a virtual image (virtual lead vehicle 84) representing the route guidance information 79 in the field of view 83 of the driver 13 of the host vehicle 10, at least when the host vehicle travel plan 71, which is the travel plan of the host vehicle 10, and the other vehicle travel plan, which is the travel plan of the other vehicle 15, do not match. Thus, when a virtual image is displayed, the energy associated with displaying the route guidance information 79 in particular tends to increase. For this reason, the display of the route guidance information 79 is appropriately suppressed using the route guidance device 11, thereby reducing the energy consumption associated with displaying the route guidance information 79 particularly well.

In addition, when virtual images are continuously displayed, the driver 13 may easily become fatigued. For this reason, the route guidance device 11 appropriately suppresses the display of the route guidance information 79, thereby achieving the secondary effect of reducing physical strain on the driver 13.

In the route guidance device 11 according to the first embodiment, the virtual image is, specifically, an image of the virtual lead vehicle 84 representing a vehicle that leads the host vehicle 10. Among virtual images, the display of the virtual lead vehicle 84 in particular has the advantage that the driver 13 can receive route guidance with minimal eye movement. However, the display of the route guidance information 79 by means of the virtual lead vehicle 84 tends to consume energy especially in displaying the route guidance information 79. Therefore, by having the route guidance device 11 suppresses the display of the route guidance information 79 as appropriate, the energy consumption associated with displaying the route guidance information 79 is particularly well reduced.

In the route guidance device 11 according to the first embodiment, the travel plan acquisition unit 65 uses the front image 72, which is an image of the other vehicle 15 captured by the host vehicle 10, to acquire the other vehicle travel plan, which is the travel plan of the other vehicle 15, based on at least one of the following: the position information, the turn signal lamp, and the brake lamp of the other vehicle 15. That is, the route guidance device 11 makes an estimation using an image of the other vehicle 15 captured by the host vehicle 10 to acquire the other vehicle travel plan.

In this manner, if an image of another vehicle 15 captured by the host vehicle 10 is used to acquire the other vehicle travel plan, the other vehicle travel plan can be acquired even if the host vehicle 10 and/or the other vehicle 15 do not have a specialized devices for acquiring and exchanging information required for route guidance. Therefore, even if the host vehicle 10 and/or the other vehicle 15 do not have a specialized device, the route guidance device 11 can use the other vehicle 15 as the lead vehicle and suppress the display of the route guidance information 79. As a result, the route guidance device 11 can reduce the energy consumption associated with displaying the route guidance information 79, even if the host vehicle 10 and/or the other vehicle 15 do not have a specialized device.

In the route guidance device 11 according to the first embodiment, the route guidance display control unit 56 displays, as the route guidance information 79, frame lines 86, etc., as lead vehicle identification information for identifying another vehicle 15 with a matching travel plan as a lead vehicle that leads the host vehicle 10. As a result, even if the display of the virtual lead vehicle 84 displayed in the standard display mode is suppressed, the other vehicle 15 that can serve as a lead vehicle is clearly indicated and the route guidance can be continued.

Thus, in the route guidance device 11 according to the first embodiment, the route guidance display control unit 56 displays frame lines 86, etc., as an instruction that the lead vehicle is to be followed. That is, when suppressing the display of the virtual lead vehicle 84, which is the route guidance information 79, the route guidance device 11 displays not only the other vehicle 15 of interest, but also the lead vehicle identification information in a form which makes it clearly understood that the other vehicle 15 should be followed. As a result, even if the display of the virtual lead vehicle 84, which is the route guidance information 79, is suppressed, the route guidance can be continued in a manner that is reliable and easily understood by the driver 13.

In the route guidance device 11 according to the first embodiment, the travel plan acquisition unit 65 acquires the other vehicle travel plan by means of estimation. However, when the host vehicle 10 can acquire the other vehicle travel plan indirectly or directly from the other vehicle 15 by means of inter-vehicle communication, the travel plan acquisition unit 65 acquires the other vehicle travel plan by means of communication, etc. Further, when the route guidance device 11 can access a server, etc., used by the other vehicle 15 to acquire information, the travel plan acquisition unit 65 acquires the other vehicle travel plan from the server, etc. In this manner, when the other vehicle travel plan is acquired directly or indirectly from the other vehicle 15 without relying on estimation, the other vehicle travel plan may include, besides information clearly indicating the travel route, enough information to essentially determine the travel plan in relation to the current position of the other vehicle 15, such as information indicating its destination.

Thus, when the travel plan acquisition unit 65 acquires the other vehicle travel plan directly or indirectly from the other vehicle 15, the route guidance device 11 can obtain an other vehicle travel plan that is accurate over a long period of time or over a long spatial interval. Moreover, when the acquired other vehicle travel plan indicates the travel route clearly, the other vehicle travel plan will be accurate, particularly over a long spatial interval or a long period of time. As a result, the route guidance device 11 can systematically suppress the display of the route guidance information 79, rather than suppressing the display of the route guidance information 79 on ad hoc basis. Therefore, the route guidance device 11 can systematically and efficiently suppress the energy consumption associated with displaying the route guidance information 79.

Further, when the travel plan acquisition unit 65 acquires the other vehicle travel plan directly or indirectly from the other vehicle 15 and the other vehicle travel plan represents a travel route selected by the other vehicle 15, the travel plan comparison unit 55 obtains a particularly reliable other vehicle travel plan. Thus, the route guidance device 11 can suppress the energy consumption associated with displaying the route guidance information 79 reliably over a longer spatial interval or a longer period of time.

Second Embodiment

In the first embodiment, when the display of the route guidance information 79 is suppressed, the route guidance device 11 displays the lead vehicle identification information, such as the frame lines 86, which allows the driver 13 to recognize the other vehicle 15 that acts as a lead vehicle. However, as a fallible human being, the driver 13 may overlook the display of the lead vehicle identification information or misunderstand its contents and fail to correctly recognize the other vehicle 15 as a lead vehicle. Therefore, when the display of the route guidance information 79 is suppressed, the route guidance device 11 preferably assists the driver 13 to at least reliably recognize the identified other vehicle 15 as a lead vehicle. For this reason, the second embodiment describes an example of assisting the recognition of the driver 13 when the display of the route guidance information 79 is suppressed, so that the other vehicle 15 serving as a lead vehicle can be more reliably recognized.

FIG. 8 shows a block diagram of the configuration of the route guidance device 201 according to the second embodiment. As shown in FIG. 8, in the route guidance device 201, the route guidance controller 44 can be configured to function as a recognition determination unit 202. The other configurations are the same as those of the route guidance device 11 of the first embodiment.

The recognition determination unit 202 determines whether the driver 13 recognizes the other vehicle 15 acting as a lead vehicle at least when the route guidance information 79 is displayed in the suppressed display mode. The recognition determination unit 202 makes this determination by a line-of-sight detection process and a recognition determination process, for example. The line-of-sight detection process detects the line of sight of the driver 13 using the driver image 73. The recognition determination process determines whether the driver 13 recognizes the other vehicle 15 by determining, for example, whether the detected line of sight of the driver 13 is within the range of the other vehicle 15 that serves as a lead vehicle for a prescribed period of time or longer. The prescribed period of time that serves as a threshold value in the recognition determination process is pre-set and empirically based for example. Further, the range of the other vehicle 15 serving as a lead vehicle is determined by extracting, for example, the other vehicle 15 serving as a lead vehicle from the front image 72. In other words, in the front image 72, if the line of sight of the driver 13 is in the range of the other vehicle 15 serving as a lead vehicle for a prescribed period of time or longer, the recognition determination unit 202 determines that the driver 13 recognizes the other vehicle 15 serving as a lead vehicle.

If the recognition determination unit 202 has determined that the driver 13 recognizes the other vehicle 15 that serves as a lead vehicle, the route guidance display control unit 56 controls the display mode of the route guidance information 79 in the same manner as in the first embodiment. That is, if the driver 13 recognizes the other vehicle 15 serving as a lead vehicle, the operation of the route guidance device 201 of the second embodiment is the same as that of the route guidance device 11 of the first embodiment.

On the other hand, if the recognition determination unit 202 has determined that the driver 13 does not recognize the other vehicle 15 as the lead vehicle, the route guidance display control unit 56 controls the display mode of the route guidance information 79 in the same manner as in the first embodiment and causes the host vehicle 10 to emphasize the other vehicle 15 as the lead vehicle with a matching travel plan. Emphasizing the other vehicle 15 means, for example, modulating or changing the lead vehicle identification information or using a vocal warning to facilitate drawing the attention of the driver 13 to the other vehicle 15. More specifically, the other vehicle 15 serving as a lead vehicle is emphasized by means of such methods as flashing the frame lines 86, changing the color of the frame lines 86, and/or playing a message instructing the driver to follow the other vehicle 15 indicated by the frame lines 86. In the present embodiment, in particular, the display is modulated or changed to emphasize the other vehicle 15 that serves as a lead vehicle.

FIG. 9 shows a flowchart of the operation of the second embodiment. As shown in Step S301 of FIG. 9, it is assumed here that the route guidance device 201 causes the host vehicle 10 to display the route guidance information 79 in the suppressed display mode. At this time, in Step S302, the recognition determination unit 202 executes the line-of-sight detection process. The line of sight of the driver 13 is thereby detected from the driver image 73. Then, in Step S303, the recognition determination unit 202 executes the recognition determination process. Thus, based on the front image 72 and the detected line of sight of the driver 13, it is determined whether the driver 13 recognizes the other vehicle 15 as the lead vehicle.

Then, in Step S304, if the driver 13 has recognized the other vehicle 15 serving as a lead vehicle as the lead vehicle, the virtual lead vehicle 84 is hidden, and the other vehicle 15 serving as the lead vehicle is indicated by the frame lines 86 in the same manner as in the first embodiment. On the other hand, in Step S304, even if the driver 13 has not recognized the other vehicle 15 as the lead vehicle, the virtual lead vehicle 84 is hidden and the other vehicle 15 serving as the lead vehicle is indicated by the frame lines 86. A lead vehicle emphasis process is then executed, in which the color of the frame lines 86 is changed or flashed, for example, to emphasize the other vehicle 15 as the lead vehicle. That is, when the route guidance information 79 is displayed in the suppressed display mode and the driver 13 does not recognize the other vehicle 15 as the lead vehicle, the other vehicle 15 serving as the lead vehicle is additionally emphasized while the suppressed display mode is maintained, so that the other vehicle 15 serving as the lead vehicle can be recognized as such.

As described above, the route guidance device 201 according to the second embodiment determines whether the driver 13 recognizes another vehicle 15 with a matching travel plan as a lead vehicle. If it is determined that the driver 13 does not recognize the other vehicle 15 with a matching travel plan as a lead vehicle, the other vehicle 15 is then emphasized as a lead vehicle. Therefore, even if the virtual lead vehicle 84 is hidden, route guidance can be reliably and appropriately continued.

The control according to the second embodiment described above is particularly effective when the other vehicle 15 with a matching travel plan, which serves as the lead vehicle, is traveling in a lane different than the host vehicle 10. This is because it may be difficult for the driver 13 to recognize the other vehicle 15 as the lead vehicle when the other vehicle 15 serving as the lead vehicle is traveling in a lane different than the host vehicle 10. Moreover, the control according to the second embodiment described above is also particularly effective when another vehicle (a vehicle without a matching travel plan) cuts in between the host vehicle 10 and the other vehicle 15 that serves as the lead vehicle and that has a matching travel plan. This is because the driver 13 may easily lose sight of the other vehicle 15 that serves as the lead vehicle if the vehicle without a matching travel plan cuts in between the host vehicle 10 and the other vehicle 15 that serves as the lead vehicle.

In the second embodiment described above, the route guidance device 201 carries out the recognition determination process based on the result of the line-of-sight detection process using the driver image 73, but the specific mode of the recognition determination process is not limited in this way. For example, the route guidance device 201 may perform the recognition determination process based on the interior sound 75. In this case, for example, the route guidance device 201 asks the driver 13 by displaying the route guidance information 79 or the like whether he/she recognizes the other vehicle 15 that serves as the lead vehicle. If the driver 13 responds that he/she recognizes the other vehicle 15 that serves as the lead vehicle by inputting a specific keyword or command by means of a vocalization from the driver 13, then the route guidance device 201 can determine that the driver 13 recognizes the other vehicle 15 that serves as the lead vehicle. Thus, when a vocalization from the driver 13 is used to determine whether the driver 13 recognizes the other vehicle 15 that serves as a lead vehicle, the route guidance device 201 can reliably perform the recognition determination process by a simple operation by the driver 13.

Third Embodiment

The above-described embodiments, modified examples, etc., are also suitable when there is more than one other vehicle 15 that could be a lead vehicle. In the third embodiment, it is assumed that plural other vehicles 15 are detected. In this case, the travel plan comparison unit 55 calculates the degrees of matching between the host vehicle travel plan 71, which is the travel plan of the host vehicle 10, and the other vehicle travel plans, which are the travel plans of the other vehicles 15, calculated for each of the plurality of other vehicles 15 that have been detected in the vicinity of the host vehicle 10. The route guidance display control unit 56 executes a degree of matching comparison process based on the degrees of matching calculated for the plurality of other vehicles 15 to determine one of the other vehicles 15 to be the lead vehicle of the host vehicle 10. Specifically, when there is a plurality of other vehicles 15 that have travel plans that match that of the host vehicle 10 and part or all of the display of the route guidance information 79 is suppressed, the route guidance display control unit 56 compares the degrees of matching calculated for each of the other vehicles 15. The route guidance display control unit 56 then selects the one other vehicle 15 with the travel plan that has the highest matching degree as the lead vehicle of the host vehicle 10.

The degree of matching of travel plans is a parameter whose value increases as the amount of overlap between the temporal or spatial intervals of the host vehicle travel plan 71 and the other vehicle travel plan increases, so that the greater the degree of matching of the travel plans, the more consistently can the other vehicle 15 act as the lead vehicle of the host vehicle 10 over longer spatial or temporal intervals. Thus, if a plurality of other vehicles 15 have travel plans that match the travel plan of the host vehicle 10 to the extent that they can become a lead vehicle, the other vehicle 15 that is to be the lead vehicle can be any of the plurality of other vehicles 15. For this reason, the route guidance display control unit 56 selects as the lead vehicle the one of the other vehicles 15 of the plurality of other vehicles 15 that can continuously act as a lead vehicle over the longest spatial or temporal interval.

FIG. 10 shows a flowchart of the operation of the third embodiment. As shown in FIG. 10, in Step S401, the travel plan comparison unit 55 executes a travel plan comparison process (see FIG. 5, Step S214) to compare the host vehicle travel plan and the other vehicle travel plans for all of the other vehicles 15 detected in the other vehicle detection process (see FIG. 5, Step S212). That is, if a plurality of other vehicles 15 are detected in the vicinity of the host vehicle 10, the travel plan comparison unit 55 calculates the degree of matching between the travel plan of the host vehicle 10 and the travel plans of the plurality of other vehicles 15.

If, in Step S402, there is a plurality of other vehicles 15 with travel plans that match the travel plan of the host vehicle 10 to a certain degree and that could be a lead vehicle, in Step S403, the travel plan comparison unit 55 performs a degree of matching comparison process to further compare the degrees of matching between them. Then, in Step S404, the route guidance display control unit 56 performs a lead vehicle selection process for selecting the one other vehicle 15 that is determined to have the highest degree of matching as the lead vehicle of the host vehicle 10. As a result, even if there is a plurality of other vehicles 15 that could be a lead vehicle, the route guidance information 79 displays the one of the other vehicles 15 that can continuously act as a lead vehicle over the longest spatial or temporal interval as the lead vehicle.

In Step S402, if there is only one other vehicle 15 that could be a lead vehicle, the degree of matching comparison process of Step S403 and the lead vehicle selection process of Step S404 can be omitted. As a result, as in the first embodiment, the one other vehicle 15 is displayed as the lead vehicle by the route guidance information 79.

As described above, in the route guidance device according to the third embodiment, the travel plan comparison unit 55 calculates the degrees of matching of the host vehicle travel plan 71, which is the travel plan of the host vehicle 10, and the other vehicle travel plans, which are the travel plans of the other vehicle 15. Then, if there is a plurality of other vehicles 15 with travel plans that match the travel plan of the host vehicle 10 and part or all of the display of the route guidance information 79 is suppressed, the route guidance display control unit 56 sets the other vehicle 15 with the travel plan that has the highest degree of matching as the lead vehicle. As a result, the route guidance device according to the third embodiment can cause the same other vehicle 15 to be displayed as the lead vehicle of the host vehicle 10 over a long spatial or temporal interval to be displayed. As a result, the annoyance to the driver 13 caused by the switching of the lead vehicle can be reduced.

Fourth Embodiment

When a transition occurs from a state (suppressed display mode) in which the display of the route guidance information 79 is suppressed to a state (standard display mode) in which the display of the route guidance information 79 is not suppressed, the display mode of the route guidance information 79 is preferably controlled as follows. In the fourth embodiment, when a transition occurs from the suppressed display mode to the standard display mode, it shall be assumed that the virtual lead vehicle 84 is displayed.

FIG. 11 shows a flowchart of the operation of the fourth embodiment. As shown in FIG. 11, in Step S501, it is assumed that it is necessary to display the virtual lead vehicle 84. For example, if a situation arises such as the other vehicle 15, which has been the lead vehicle, is expected to leave the travel path of the host vehicle 10 imminently, it becomes necessary to display the virtual lead vehicle 84.

At this time, the route guidance information creation unit 53 executes an other vehicle image extraction process of Step S502, a degree of similarity calculation process of Step S503, and a virtual lead vehicle image selection process of Step S504, in order to create route guidance information 79. The other vehicle image extraction process of Step S502 is a process in which the route guidance information creation unit 53 uses a front image 72 to extract an image of the other vehicle 15 serving as the lead vehicle. The degree of similarity calculation process of Step S503 is a process in which the route guidance information creation unit 53 calculates the degree of similarity between the other vehicle 15 that has been the lead vehicle and a plurality of images of the virtual lead vehicles 84 included in the guidance data 49. The virtual lead vehicle image selection process of Step S504 is a process in which the route guidance information creation unit 53 selects an image to be displayed as the virtual lead vehicle 84 from the guidance data 49 in accordance with the calculated degree of similarity. For example, the route guidance information creation unit 53 creates the route guidance information 79 using the virtual lead vehicle 84 that, in terms of appearance, has the highest degree of similarity to the other vehicle 15 that was the lead vehicle from among the plurality of virtual lead vehicles 84. That is, if the other vehicle 15 that was the lead vehicle is an SUV (Sport Utility Vehicle) type vehicle, for example, the virtual lead vehicle 84 that has a similar or matching external appearance, i.e., shape and/or color, for example, is displayed in the host vehicle 10 for the purpose of route guidance.

As described above, when the route guidance device according to the fourth embodiment displays the virtual lead vehicle 84 as the route guidance information 79, the external appearance of the virtual lead vehicle 84 is made as similar as possible to the external appearance of the other vehicle 15 that was the lead vehicle immediately before. This provides the host vehicle 10 with route guidance in which the lead vehicle switches smoothly from an actual vehicle (other vehicle 15) to the virtual lead vehicle 84.

It should be noted that it is preferable that the route guidance device according to the fourth embodiment described above display the virtual lead vehicle 84 superimposed on the other vehicle 15 that was the lead vehicle before the virtual lead vehicle 84 that is to be displayed is actually displayed. For example, in the case that the other vehicle 15 serving as the lead vehicle will proceed in a different direction than the host vehicle 10 two intersections away, the route guidance device preferably displays the virtual lead vehicle 84 superimposed on the other vehicle 15 that serves as the lead vehicle starting at the next intersection (one intersection away). In other words, the route guidance device preferably displays the virtual lead vehicle 84 at a prescribed distance or period of time before the point or time at which it is estimated that the other vehicle 15 that serves as the lead vehicle will change directions. Thus, when the virtual lead vehicle 84 is displayed superimposed on the other vehicle 15 that serves as the lead vehicle in advance, route guidance, in which the lead vehicle switches smoothly from an actual vehicle (other vehicle 15) to a virtual lead vehicle 84, is provided to the host vehicle 10.

Fifth Embodiment

In the modified example of the fourth embodiment described above, when the display of the virtual lead vehicle 84 is started, the virtual lead vehicle 84 is displayed superimposed on the other vehicle 15 serving as the lead vehicle, but the display of the virtual lead vehicle 84 can be started in a different mode. In the fifth embodiment, when the display of the virtual lead vehicle 84 is started, a space is reserved for displaying the virtual image of the virtual lead vehicle 84, etc.

FIG. 12 shows a block diagram of the configuration of the route guidance device 501 according to the fifth embodiment. As shown in FIG. 12, in the route guidance device 501, the route guidance controller 44 also functions as a display space reservation unit 502. The rest of the configuration is the same as that of any one of the route guidance devices in the embodiments described above.

When at least the suppressed display mode is canceled and the display of a virtual image of the virtual lead vehicle 84 is to be started, the display space reservation unit 502 detects a display space for displaying said virtual image. When there is insufficient display space for displaying the virtual image, the display space reservation unit 502 causes the host vehicle 10 to issue an instruction (hereinafter referred to as a driving instruction) pertaining to a driving operation to reserve a display space.

FIG. 13 shows a flowchart of the operation of the fifth embodiment. As shown in FIG. 13, here it is assumed that the route guidance device 501 in Step S601 cancels the suppressed display mode and in Step S602 starts the display of the virtual lead vehicle 84 as a virtual image. In this case, in Step S603, the display space reservation unit 502 executes a display space determination process using the size, etc., of the virtual lead vehicle 84 and of the front image 72, for example. The display space determination process determines whether there is a display space between the host vehicle 10 and the other vehicle 15 serving as the lead vehicle or another vehicle immediately ahead of the host vehicle 10 in which it would be possible to display the virtual lead vehicle 84 without superimposing it on the other vehicle 15, etc.

If it is determined in Step S604 that there is a display space for the virtual lead vehicle 84, then in Step S605, the route guidance information notification process is executed so that the virtual lead vehicle 84 is displayed in said display space. On the other hand, if it is determined in Step S604 that there is no display space for the virtual lead vehicle 84, or if it is determined that the display space is insufficient in consideration of the size, etc., of the virtual lead vehicle 84, the display space reservation unit 502 respectively executes, in Step S606, an additional guidance information creation process or, in Step S607, an additional guidance information notification process.

The additional guidance information creation process of Step S606 is a process in which the display space reservation unit 502 creates additional guidance information to be added to the route guidance to provide driving instructions to the driver 13 to resolve the lack of display space, etc., for the virtual lead vehicle 84. For example, in the additional guidance information creation process, an instruction in the form of a display message, voice message, or the like, such as "please increase distance between vehicles," is created in accordance with the situation, such as insufficient display space.

The additional guidance information notification process of Step S607 is a process in which the display space reservation unit 502 transmits the message, etc., created by the additional guidance information creation process to the host vehicle 10, and causes the message, etc., to be displayed.

As described above, the route guidance device 501 according to the fifth embodiment is equipped with the display space reservation unit 502. The display space reservation unit 502 detects a display space for displaying the virtual lead vehicle 84, etc., which is a virtual image, and when there is insufficient display space, causes the host vehicle 10 to issue driving instructions for securing the display space. Thus, by providing driving instructions when a virtual image of the virtual lead vehicle 84, etc., is displayed, the display space can be reserved, so that even when the lead vehicle is switched from an actual vehicle (other vehicle 15) to a virtual image of the virtual lead vehicle 84, etc., reliable route guidance can be continued.

In the above-described embodiments and modified examples, when there is another vehicle 15 that has a travel plan that matches that of the host vehicle 10 and that could be a lead vehicle, the display of the route guidance information 79 is suppressed to reduce the energy consumption associated with displaying the route guidance information 79. However, no limitation is imposed thereby; in addition to suppressing the display of the route guidance information 79, the processing intervals of some or all of the various processes carried out for the route guidance can be extended, or temporarily suspended. In this way, in addition to suppressing the display of the route guidance information 79, when the processing intervals of the various processes, such as calculations performed for route guidance are extended or temporarily suspended, this reduces the computational load, etc., on the host vehicle 10 and/or the route guidance device. Therefore, not only is the energy associated with displaying the route guidance information 79 reduced, but the processing load of the various processes for performing route guidance, i.e., the energy consumed for computations, etc., is also reduced.

Embodiments of the present invention were described above, but the configurations described in the foregoing embodiments and modified examples illustrate only some of the application examples of the present invention, and are not intended to limit the technical scope of the present invention. For example, some or all of the above-described embodiments and modified examples can be implemented in combination. In addition, the various processes illustrated in the above-described embodiments and modified examples are executed based on programs for causing a computer to execute the various processes. For this reason, the above-described embodiments and modified examples can be ascertained as embodiments of a method, a program, and a storage medium that stores said program for realizing functions that execute these processes. Moreover, an updating process for adding or changing functions, etc., of the route guidance device 11 can be used to update the program for realizing the processes pertaining to the above-described embodiments and modified examples.

The invention claimed is:

1. A route guidance device for displaying route guidance information on a host vehicle as an image that guides the host vehicle along a route or that indicates a course that the host vehicle should take, the route guidance device comprising:

a controller including a processor, the controller being configured to acquire a first travel plan representing travel route that the host vehicle plans to travel and a second travel plan representing a travel route that another vehicle plans to travel, the other vehicle being a vehicle different from the host vehicle, compare the first travel plan and the second travel plan, and cause the host vehicle to display the route guidance information at least when the first travel plan and the second travel plan do not match, and suppress the display of some or all of the route guidance information when the first travel plan and the second travel plan do match.

2. The route guidance device according to claim 1, wherein the route guidance display control unit is configured to display a virtual image representing the route guidance information in a field of view of a driver of the host vehicle, at least when the first travel plan and the second travel plan do not match.

3. The route guidance device according to claim 2, wherein the virtual image is an image of a virtual lead vehicle representing a vehicle leading the host vehicle.

4. The route guidance device according to claim 1, wherein the controller is configured to use an image of the other vehicle captured by the host vehicle to acquire the second travel plan based on at least one of the following: position information, the turn signal lamp, and the brake lamps of the other vehicle.

5. The route guidance device according to claim 1, wherein when the first travel plan and the second travel plan match, the controller is configured to display lead vehicle identification information, which identifies the other vehicle as a lead vehicle for leading the host vehicle, as the route guidance information.

6. The route guidance device according to claim 5, wherein the route guidance display control unit is configured to display an instruction to follow the lead vehicle.

7. The route guidance device according to claim 5, wherein the travel plan comparison unit is configured to calculate a degree of matching between the first travel plan and the second travel plan, and upon determining there are a plurality of other vehicles with second travel plans that match the first travel plan, the route guidance display control unit is configured to select the one other vehicle having the second travel plan with the highest degree of matching as the lead vehicle and suppress displaying a part or all of the route guidance information.

8. The route guidance device according to claim 3, wherein the controller is further configured to detect a display space for displaying the virtual image, and upon determining there is insufficient display space, issue driving instructions to the host vehicle for securing the display space.

9. A route guidance method executed by a route guidance device including a processor to display route guidance information on a host vehicle as an image that guides the host vehicle along a route or that indicates a course that the host vehicle should take, the route guidance method comprising:

acquiring a first travel plan representing a travel route that the host vehicle plans to travel and a second travel plan representing a travel route that another vehicle plans to travel, the other vehicle being a vehicle different from the host vehicle, respectively, comparing the first travel plan and second the travel plan, and displaying the route guidance information on the host vehicle at least when the first travel plan and the second travel plan do not match, and suppressing the display of a part or all of the route guidance information when the first travel plan and the second travel plan do match.

10. A non-transitory computer-readable medium storing a route guidance program that causes a computer to operate as a route guidance device for displaying route guidance information on a host vehicle as an image that guides the host vehicle along a route or that indicates a course that the host vehicle should take, wherein:

the route guidance program causes the computer to perform operations comprising:

acquiring a first travel plan representing a travel route that the host vehicle plans to travel and a second travel plan representing a travel route that another vehicle plans to travel, the other vehicle being a vehicle different from the host vehicle, comparing the first travel plan and the second travel plan, displaying the route guidance information on the host vehicle at least when the first travel plan and the second travel plan do not match, and suppressing the display of a part or all of the route guidance information when the first travel plan and the second travel plan do match.

* * * * *